(12) United States Patent
Lim

(10) Patent No.: US 12,147,628 B2
(45) Date of Patent: Nov. 19, 2024

(54) DISPLAY DEVICE AND TOUCH SENSING SYSTEM INCLUDING THE SAME

(71) Applicant: SAMSUNG DISPLAY CO., LTD., Yongin-si (KR)

(72) Inventor: Sang Hyun Lim, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/153,069

(22) Filed: Jan. 11, 2023

(65) Prior Publication Data
US 2023/0418409 A1 Dec. 28, 2023

(30) Foreign Application Priority Data

Jun. 23, 2022 (KR) ......................... 10-2022-0077049

(51) Int. Cl.
| | |
|---|---|
| *G06F 3/041* | (2006.01) |
| *G06F 3/0354* | (2013.01) |
| *G06F 3/044* | (2006.01) |
| *G06F 3/046* | (2006.01) |

(52) U.S. Cl.
CPC ...... *G06F 3/04166* (2019.05); *G06F 3/03545* (2013.01); *G06F 3/0446* (2019.05); *G06F 3/046* (2013.01); *G06F 2203/04106* (2013.01)

(58) Field of Classification Search
CPC ......... G09G 3/3233; G09G 2300/0452; G09G 2300/0842; G09G 2310/0297; G09G 2310/08; G09G 2320/0626
See application file for complete search history.

(56) References Cited

U.S. PATENT DOCUMENTS

| | | | |
|---|---|---|---|
| 4,686,332 A | 8/1987 | Greanias et al. | |
| 2017/0192591 A1* | 7/2017 | Jang | ................... G06F 3/04166 |
| 2023/0049665 A1 | 2/2023 | Lim | |

FOREIGN PATENT DOCUMENTS

| | | | | |
|---|---|---|---|---|
| EP | 4134796 | | 2/2023 | |
| KR | 10-2013-0108614 | | 10/2013 | |
| KR | 10-2015-0019594 | | 2/2015 | |
| KR | 10-2017-0060469 A | * | 6/2017 | |
| KR | 10-2023-0023857 | | 2/2023 | |
| WO | WO-2015200396 A1 | * | 12/2015 | ......... G06F 3/03545 |

* cited by examiner

*Primary Examiner* — Stacy Khoo
(74) *Attorney, Agent, or Firm* — F. Chau & Associates, LLC

(57) ABSTRACT

A display device includes a display panel including a plurality of pixels arranged in an image display area, a touch sensing unit disposed on a front surface of the display panel that senses a touch of a user's body part and a touch of an electronic pen, a display driving circuit that drives the pixels of the image display area, and a touch sensing circuit that generates touch coordinate data by detecting touch positions of the user's body part and the electronic pen. The touch sensing circuit senses the touch of the user's body part and allows the electronic pen to be charged during a touch electrode driving period by supplying touch driving signals generated by mixing driving signals of different frequency bands to touch electrodes during the touch electrode driving period.

20 Claims, 22 Drawing Sheets

DISPLAY DEVICE AND TOUCH SENSING SYSTEM INCLUDING THE SAME

CROSS-REFERENCE TO RELATED APPLICATIONS

This application claims priority under 35 U.S.C. § 119 to Korean Patent Application No. 10-2022-0077049, filed on Jun. 23, 2022 in the Korean Intellectual Property Office, the disclosure of which is incorporated by reference herein in its entirety.

TECHNICAL FIELD

Embodiments of the present disclosure relate to a display device and a touch sensing system including the same.

DISCUSSION OF RELATED ART

As the information society develops, the demand for various types of display devices that display images is increasing. For example, display devices are applied to various electronic devices such as smartphones, digital cameras, laptop computers, navigation devices, and smart televisions. The display devices may be, for example, flat panel display devices such as liquid crystal display devices, field emission display devices, and organic light emitting display devices. Among these flat panel display devices, a light emitting display device includes a light emitting element that enables each pixel of a display panel to emit light by itself. Thus, a light emitting display device can display an image without a backlight unit that provides light to the display panel.

Recent display devices support a touch input using a user's body part (e.g., a finger) and a touch coordinate sensing function using an electronic pen. By sensing a touch position using the electronic pen, the display device can sense the touch position more precisely than when using only a touch input using the user's body part.

SUMMARY

Aspects of the present disclosure provide a display device capable of sensing a touch of an electronic pen using a touch sensing unit for sensing a touch of a user's body part and a touch sensing system including the display device.

Aspects of the present disclosure also provide a display device capable of sensing a touch of a body part and a touch of an electronic pen using a touch driving signal generated by mixing a first driving signal of a first frequency for sensing the touch of the body part and a second driving signal of a second frequency for sensing the touch of the electronic pen and a touch sensing system including the display device.

However, aspects of the present disclosure are not limited to the ones set forth herein.

According to an embodiment of the present disclosure, a display device includes a display panel including a plurality of pixels arranged in an image display area, a touch sensing unit disposed on a front surface of the display panel that senses a touch of a user's body part and a touch of an electronic pen, a display driving circuit that drives the pixels of the image display area, and a touch sensing circuit that generates touch coordinate data by detecting touch positions of the user's body part and the electronic pen. The touch sensing circuit senses the touch of the user's body part and allows the electronic pen to be charged during a touch electrode driving period by supplying touch driving signals generated by mixing driving signals of different frequency bands to touch electrodes during the touch electrode driving period.

In an embodiment, the touch electrodes include a plurality of driving electrodes extending parallel to each other in a first direction in a touch sensing area of the display panel, and a plurality of sensing electrodes extending parallel to each other in a second direction intersecting the first direction in the touch sensing area. The driving electrodes and the sensing electrodes are formed in a rod type or a bar type in which polygonal electrodes are connected in the first or second direction.

In an embodiment, the touch sensing circuit includes a plurality of driving signal supply circuit units that supply touch driving signals in which first and second driving signals of first and second frequency bands different from each other among the touch driving signals are mixed to odd-numbered driving electrodes or odd-numbered groups of driving electrodes among the driving electrodes during the touch electrode driving period of the touch sensing unit, and a plurality of signal analysis circuit units that detect touch sensing signals of the second frequency band output from even-numbered or even-numbered groups of driving electrodes among the driving electrodes during a sensing signal detection period after the touch electrode driving period and detect a touch of the electronic pen according to a change in an amplitude of each of the detected touch sensing signals.

In an embodiment, the touch sensing circuit further includes a plurality of sensing signal analysis circuit units that detect touch sensing signals of the first frequency band output from the sensing electrodes during the touch electrode driving period and sense the touch of the user's body part according to a change in a current amount or voltage magnitude of each of the detected touch sensing signals.

In an embodiment, the sensing signal analysis circuit units detect touch sensing signals of the second frequency band output from the sensing electrodes during the sensing signal detection period among the touch sensing signals and detect the touch of the electronic pen according to a change in the amplitude of each of the detected touch sensing signals.

In an embodiment, each of the sensing signal analysis circuit units includes a differential amplifier circuit that detects a voltage difference between touch sensing signals input through adjacent odd-numbered and even-numbered sensing electrodes and outputs a differential signal according to the detected voltage difference, a band-pass filtering circuit that filters the differential signal of the first or second frequency band in response to a first or second frequency setting signal and outputs only the filtered differential signals of the first or second frequency band, and a carry signal input circuit that mixes the differential signal of the first or second frequency band with a first or second carry signal and outputs a resultant signal.

In an embodiment, each of the driving signal supply circuit units includes a first signal generation unit that generates a first driving signal of the first frequency band, a first AC conversion circuit unit that modulates the first driving signal into an analog signal of the first frequency band and outputs the analog signal of the first frequency band, a second signal generation unit that generates a second driving signal of the second frequency band, a second AC conversion circuit unit that modulates the second driving signal into an analog signal of the second frequency band and outputs the analog signal of the second frequency band, and a mixed signal output unit that mixes the first and second driving signals of the first and second frequency bands and generates and outputs a touch driving signal in which the first and second frequency bands are mixed among the touch driving signals.

In an embodiment, each of the signal analysis circuit units includes a differential amplifier circuit that outputs a differential signal according to a voltage difference between touch sensing signals input through the odd-numbered and even-numbered driving electrodes or adjacent odd-numbered and even-numbered groups of driving electrodes among the touch sensing signals, a band-pass filtering circuit that filters the differential signal of the first or second frequency band in response to a first or second frequency setting signal and outputs only the filtered differential signal of the first or second frequency band, and a carry signal input circuit that mixes the differential signal of the first or second frequency band with a first or second carry signal and outputs a resultant signal.

In an embodiment, the driving signal supply circuit units simultaneously supply the touch driving signals in which the first and second driving signals are mixed to the odd-numbered driving electrodes or the odd-numbered groups of driving electrodes during the touch electrode driving period or sequentially supply the touch driving signals to the odd-numbered groups of driving electrodes, and the sensing signal analysis circuit units band-pass filter the touch sensing signals output from the sensing electrodes in the first frequency band according to the first frequency setting signal during the touch electrode driving period, classify the filtered touch sensing signals as touch sensing signals for sensing a touch of a body part by mixing the filtered touch sensing signals with the first carry signal, and measure a change in a charge amount of mutual capacitance applied to touch nodes according to a change in a voltage magnitude of each of the classified touch sensing signals.

In an embodiment, the signal analysis circuit units detect the touch sensing signals of the second frequency band sequentially or simultaneously output from the even-numbered driving electrodes or the even-numbered groups of driving electrodes during the sensing signal detection period and detect a touch and a touch position of the electronic pen according to a change in the amplitude of each of the detected touch sensing signals.

In an embodiment, the driving signal supply circuit units sequentially supply the touch driving signals in which the first and second driving signals are mixed to the odd-numbered driving electrodes or the odd-numbered groups of driving electrodes during the touch electrode driving period in units of at least one frame period, and the signal analysis circuit units receive touch sensing signals output from the even-numbered groups of driving electrodes during the sensing signal detection period, band-pass filter the touch sensing signals in the second frequency band according to the second frequency setting signal, and mix the filtered touch sensing signals with the second carry signal to classify the filtered touch sensing signals as touch sensing signals for sensing a touch of the electronic pen.

In an embodiment, the driving signal supply circuit units sequentially supply the touch driving signals in which the first and second driving signals are mixed to the odd-numbered driving electrodes or the odd-numbered groups of driving electrodes only during odd-numbered touch electrode driving periods among touch electrode driving periods of at least one frame period, and odd-numbered signal analysis circuit units among the signal analysis circuit units band-pass filter touch sensing signals output from the even-numbered driving electrodes during odd-numbered sensing signal detection periods in the second frequency band and detect a presence of a touch of the electronic pen and a touch start time by detecting a change in the amplitude of each of the touch sensing signals.

In an embodiment, the driving signal supply circuit units sequentially supply the touch driving signals in which the first and second driving signals are mixed to the odd-numbered driving electrodes or the odd-numbered groups of driving electrodes during the touch electrode driving period in units of at least one frame period, and the sensing signal analysis circuit units band-pass filter touch sensing signals output from the sensing electrodes during the sensing signal detection period in the second frequency band, detect a change in the amplitude of each of the touch sensing signals, and detect a touch position of the electronic pen according to the change in the amplitude of each of the touch sensing signals.

In an embodiment, the signal analysis circuit units band-pass filter touch sensing signals output from the even-numbered groups of driving electrodes during the sensing signal detection period in the second frequency band, detect a change in the amplitude of each of the touch sensing signals, and detect the touch position of the electronic pen according to the change in the amplitude of each of the touch sensing signals.

According to an embodiment of the present disclosure, a touch sensing system includes a display device including a display panel including a plurality of pixels arranged in an image display area, and a display driving circuit that drives the pixels, a touch sensing unit disposed on a front surface of the display panel that senses a touch of a user's body part and a touch of an electronic pen, and a touch sensing circuit that generates touch coordinate data by detecting touch positions of the user's body part and the electronic pen. The touch sensing circuit senses the touch of the user's body part through the touch sensing unit and allows the electronic pen to be charged by supplying touch driving signals generated by mixing driving signals of different frequency bands to touch electrodes of the touch sensing unit.

In an embodiment, the touch sensing circuit includes a plurality of driving signal supply circuit units that supply touch driving signals in which first and second driving signals of first and second frequency bands are mixed to odd-numbered driving electrodes or odd-numbered groups of driving electrodes among driving electrodes disposed in the touch sensing unit during a touch electrode driving period of the touch sensing unit, and a plurality of signal analysis circuit units that detect touch sensing signals of the second frequency band output from even-numbered driving electrodes or even-numbered groups of driving electrodes among the driving electrodes during a sensing signal detection period after the touch electrode driving period and detect a touch of the electronic pen according to a change in an amplitude of each of the detected touch sensing signals.

In an embodiment, the touch sensing circuit further includes a plurality of sensing signal analysis circuit units that detect touch sensing signals of the first frequency band output from sensing electrodes disposed in the touch sensing unit during the touch electrode driving period and sense the touch of the user's body part according to a change in a current amount or voltage magnitude of each of the detected touch sensing signals.

In an embodiment, the sensing signal analysis circuit units detect touch sensing signals of the second frequency band output from the sensing electrodes during the sensing signal detection period and detect the touch of the electronic pen according to a change in the amplitude of each of the detected touch sensing signals.

In an embodiment, each of the driving signal supply circuit units includes a first signal generation unit that generates a first driving signal of the first frequency band, a first AC conversion circuit unit that modulates the first driving signal into an analog signal of the first frequency band and outputs the analog signal of the first frequency band, a second signal generation unit that generates a second driving signal of the second frequency band, a second AC conversion circuit unit that modulates the second driving signal into an analog signal of the second frequency band and outputs the analog signal of the second frequency band, and a mixed signal output unit that mixes the first and second driving signals of the first and second frequency bands and generates and outputs a touch driving signal in which the first and second frequency bands are mixed among the touch driving signals.

In an embodiment, each of the signal analysis circuit units includes a differential amplifier circuit that outputs a differential signal according to a voltage difference between touch sensing signals input through the odd-numbered and even-numbered driving electrodes or adjacent odd-numbered and even-numbered groups of driving electrodes among the touch sensing signals, a band-pass filtering circuit that filters the differential signal of the first or second frequency band in response to a first or second frequency setting signal and outputs only the filtered differential signal of the first or second frequency band, and a carry signal input circuit that mixes the differential signal of the first or second frequency band with a first or second carry signals and outputs a resultant signal.

A display device and a touch sensing system including the same according to embodiments can sense a touch of an electronic pen using a touch sensing unit for sensing a touch of a user's body part without including a separate sensor layer or digitizer layer. Therefore, it is possible to simplify the structure of the display device and the touch sensing system including the same according to embodiments, and reduce the thickness thereof, thereby reducing manufacturing costs.

In addition, the display device and the touch sensing system including the same according to embodiments allow the electronic pen to be charged during a period of sensing the user's body part and sense a touch position of the electronic pen during a discharging period of the electronic pen, thereby increasing the touch sensing speed of the body part or the electronic pen and further increasing the touch sensing accuracy.

However, the effects of the present disclosure are not restricted to the one set forth herein.

BRIEF DESCRIPTION OF THE DRAWINGS

The above and other features of the present disclosure will become more apparent by describing in detail embodiments thereof with reference to the accompanying drawings, in which.

DETAILED DESCRIPTION

Figure 1:
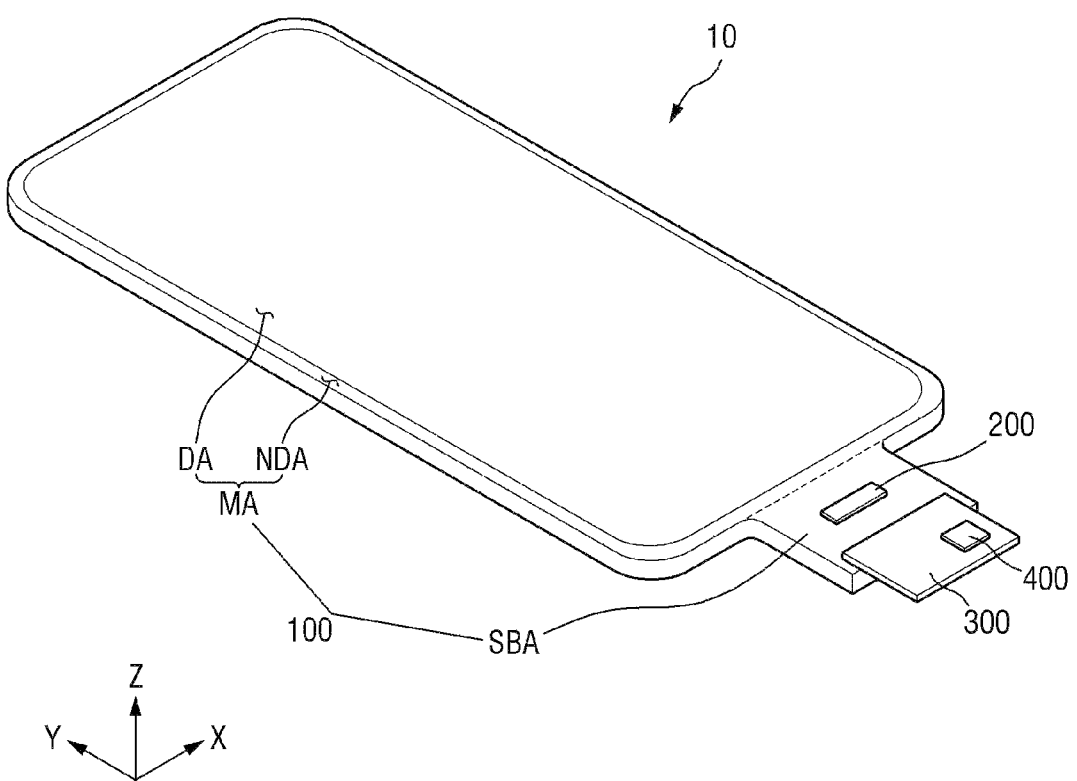
FIG. 1 is a perspective view of a display device according to an embodiment.

Embodiments of the present disclosure will be described more fully hereinafter with reference to the accompanying drawings. Like reference numerals may refer to like elements throughout the accompanying drawings.

It will be understood that when a component such as a film, a region, a layer, etc., is referred to as being "on", "connected to", "coupled to", or "adjacent to" another component, it can be directly on, connected, coupled, or adjacent to the other component, or intervening components may be present. It will also be understood that when a component is referred to as being "between" two components, it can be the only component between the two components, or one or more intervening components may also be present. Other words used to describe the relationships between components should be interpreted in a like fashion.

It will be understood that, although the terms "first," "second," etc. may be used herein to describe various elements, these elements should not be limited by these terms. These terms are only used to distinguish one element from another element. For example, a first element discussed below could be termed a second element without departing from the teachings of the present disclosure. Similarly, the second element could also be termed the first element.

Each of the features of the various embodiments of the present disclosure may be combined or combined with each other, in part or in whole, and technically various interlocking and driving are possible. Each embodiment may be implemented independently of each other or may be implemented together in an association.

Figure 2:
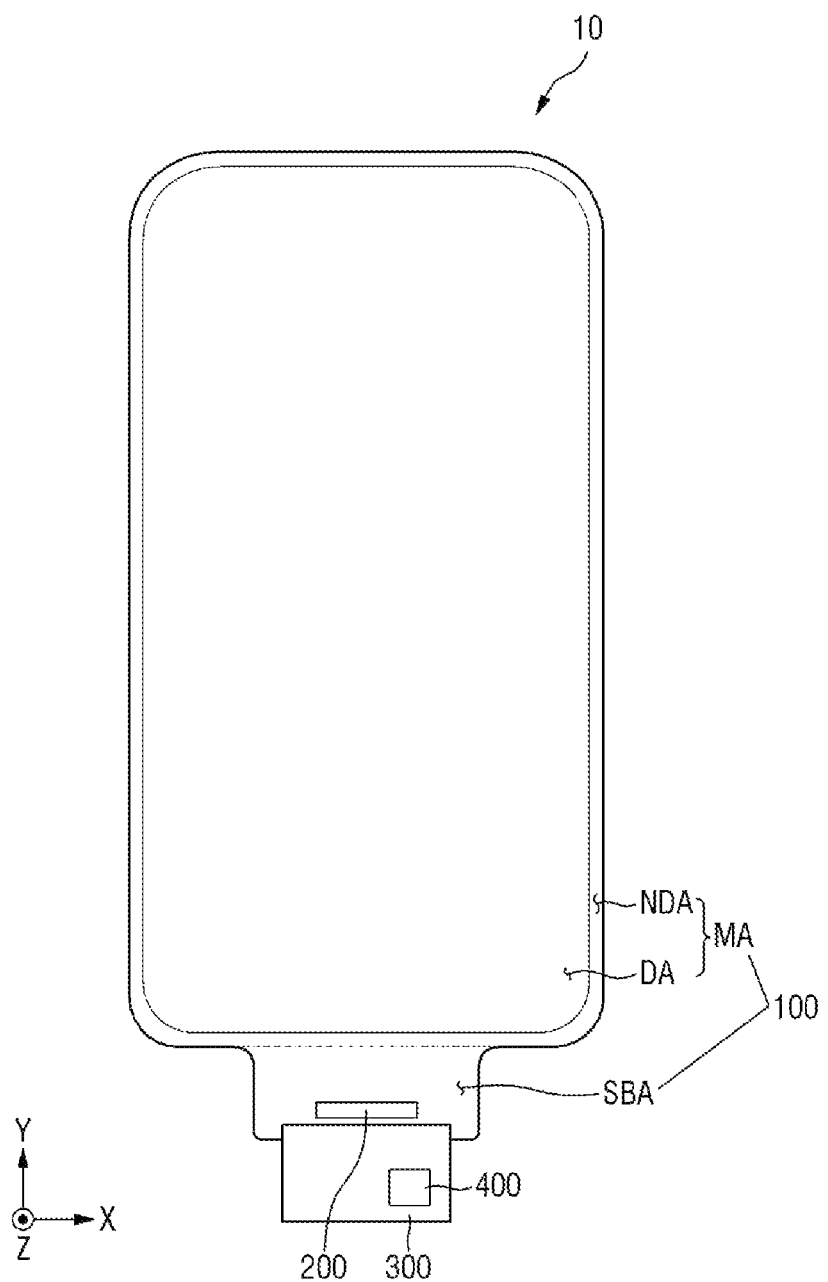
FIG. 2 is a plan view of the display device of FIG. 1 according to an embodiment.
Figure 3:
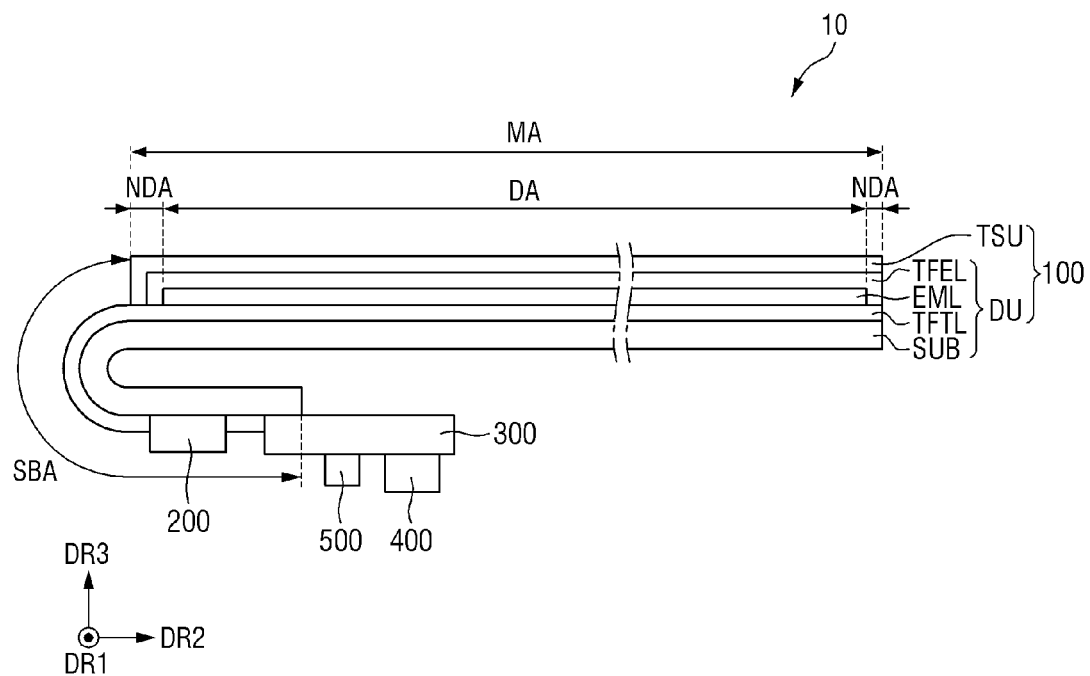
FIG. 3 is a side view of the display device of FIG. 1 according to an embodiment.

FIG. 1 is a perspective view of a display device 10 according to an embodiment. FIG. 2 is a plan view of the display device 10 according to an embodiment. FIG. 3 is a side view of the display device 10 according to an embodiment.

Referring to FIGS. 1 through 3, the display device 10 according to an embodiment may be applied to portable electronic devices such as, for example, mobile phones, smartphones, tablet personal computers (PCs), mobile communication terminals, electronic notebooks, electronic books, portable multimedia players (PMPs), navigation devices, and ultra-mobile PCs (UMPCs). Alternatively, the display device 10 according to an embodiment may be applied as, for example, a display unit of a television, a laptop computer, a monitor, a billboard, or an Internet of Things (IoT) device. Alternatively, the display device 10 according to an embodiment may be applied to wearable devices such as, for example smartwatches, watch phones, glass-like displays, and head-mounted displays (HMDs). Alternatively, the display device 10 according to an embodiment may be applied to, for example, a dashboard of a vehicle, a center fascia of a vehicle, a center information display (CID) disposed on a dashboard of a vehicle, a room mirror display replacing side mirrors of a vehicle, or a display disposed on the back of a front seat as an entertainment device for rear-seat passengers of a vehicle.

The display device 10 according to an embodiment may be a light emitting display device such as, for example, an organic light emitting display device using an organic light emitting diode, a quantum dot light emitting display device including a quantum dot light emitting layer, an inorganic light emitting display device including an inorganic semiconductor, or a micro- or nano-light emitting display device using a micro- or nano-light emitting diode. A case in which the display device 10 is an organic light emitting display device will be mainly described below, but embodiments of the present disclosure are not limited thereto.

The display device 10 according to an embodiment includes a display panel 100, a display driving circuit 200, a display circuit board 300, and a touch sensing circuit 400.

The display panel 100 may be shaped to have a rectangular plane having short sides in a first direction (X-axis direction) and long sides in a second direction (Y-axis direction) intersecting the first direction (X-axis direction). Each corner where a short side extending in the first direction (X-axis direction) meets a long side extending in the second direction (Y-axis direction) may be rounded with a predetermined curvature or may be right-angled. The planar shape of the display panel 100 is not limited to a quadrilateral shape, but may also be, for example, another polygonal shape, a circular shape, or an oval shape. The display panel 100 may be formed flat, but embodiments of the present disclosure are not limited thereto. For example, the display panel 100 may include curved portions formed at left and right ends and having a constant or varying curvature. In addition, the display panel 100 may be formed to be flexible so that it can be curved, bent, folded, or rolled.

The display panel 100 includes a main area MA and a sub-area SBA.

The main area MA includes a display area DA in which an image is displayed and a non-display area NDA in which an image is not displayed located around the display area DA. The display area DA includes pixels that display an image. The display area DA may emit light from an emission area of each pixel or a plurality of opening areas. For example, the display panel 100 may include a pixel circuit including switching elements, a pixel defining layer defining the emission areas or the opening areas, and self-light emitting elements. For example, the self-light emitting elements may include at least one of, but are not limited to, an organic light emitting diode including an organic light emitting layer, a quantum dot light emitting diode including a quantum dot light emitting layer, and an inorganic light emitting diode including an inorganic semiconductor.

The non-display area NDA may be an area outside the display area DA. The non-display area NDA may be defined as an edge area of the main area MA of the display panel 100. The non-display area NDA may include a gate driver that supplies gate signals to gate lines and fan-out lines that connect the display driving circuit 200 and the display area DA.

The sub-area SBA may protrude from a side of the main area MA in the second direction (Y-axis direction).

Although the sub-area SBA is unfolded in FIGS. 1 and 2, it may also be bent, as illustrated in FIG. 3. In this case, the sub-area SBA may be disposed on a rear surface of the display panel 100. When the sub-area SBA is bent, the sub-area SBA may be overlapped by the main area MA in a third direction (Z-axis direction), which is a thickness direction of a substrate SUB. The display driving circuit 200 may be disposed in the sub-area SBA.

In addition, the display panel 100 may include a display module DU including the substrate SUB, a thin-film transistor layer TFTL, a light emitting element layer EML and an encapsulation layer TFEL, and a touch sensing unit TSU formed on a front surface of the display module DU, as illustrated in FIG. 3.

The thin-film transistor layer TFTL may be disposed on the substrate SUB. The thin-film transistor layer TFTL may be disposed in the main area MA and the sub-area SBA. The thin-film transistor layer TFTL includes thin-film transistors.

The light emitting element layer EML may be disposed on the thin-film transistor layer TFTL. The light emitting element layer EML may be disposed in the display area DA of the main area MA. The light emitting element layer EML includes light emitting elements disposed in light emitting units.

The encapsulation layer TFEL may be disposed on the light emitting element layer EML. The encapsulation layer TFEL may be disposed in the display area DA and the non-display area NDA of the main area MA. The encapsulation layer TFEL includes at least one inorganic layer and at least one organic layer that encapsulate the light emitting element layer EML.

The touch sensing unit TSU may be integrally formed with the display panel 100 or may be separately formed and then mounted or assembled on a front surface of the display panel 100. The touch sensing unit TSU may be integrally formed with the encapsulation layer TFEL or may be mounted on the encapsulation layer TFEL to sense touch positions of a user's body part such as a finger or an electronic pen such as a stylus pen.

A cover window may be disposed on the touch sensing unit TSU. The cover window may protect an upper portion of the display panel 100. The cover window may be attached to the touch sensing unit TSU by a transparent adhesive member such as, for example, an optically clear adhesive (OCA) film or an optically clear resin (OCR). The cover window may be an inorganic material such as glass or may be an organic material such as plastic or a polymer material. A polarizing film may be additionally disposed between the touch sensing unit TSU and the cover window. The polarizing film may prevent or reduce deterioration of image visibility due to reflection of external light.

The display driving circuit 200 may generate control signals and data voltages that drive the display panel 100. The display driving circuit 200 may be formed as an integrated circuit and attached to the display panel 100 using, for example, a chip-on-glass (COG) method, a chip-on-plastic (COP) method, or an ultrasonic bonding method. However, embodiments of the present disclosure are not limited thereto. For example, the display driving circuit 200 may also be attached to the display circuit board 300 using a chip-on-film (COF) method.

The display circuit board 300 may be attached to an end of the sub-area SBA of the display panel 100. Accordingly, the display circuit board 300 may be electrically connected to the display panel 100 and the display driving circuit 200. The display panel 100 and the display driving circuit 200 may receive, for example, digital video data, timing control signals, and driving voltages through the display circuit board 300. The display circuit board 300 may be, for example, a flexible printed circuit board, a printed circuit board, or a flexible film such as a chip-on-film.

The touch sensing circuit 400 may be disposed on the display circuit board 300. The touch sensing circuit 400 may be formed as an integrated circuit and attached to the display circuit board 300. Alternatively, the touch sensing circuit 400 may be attached to the display circuit board 300 using the COF method.

The touch sensing circuit 400 may be electrically connected to touch electrodes of the touch sensing unit TSU and may detect touches and touch positions of a user's body part such as a finger or an electronic pen. For example, the touch sensing circuit 400 generates a touch driving signal by mixing a first driving signal of a first frequency band for sensing a touch of a body part and a second driving signal of a second frequency band for sensing a touch of an electronic pen during a touch electrode driving period, and transmits the touch driving signal to the touch electrodes of the touch sensing unit TSU. Then, the touch sensing circuit 400 measures a charge change in the mutual capacitance of each of a plurality of touch nodes formed by the touch electrodes during the touch electrode driving period. The mutual capacitance of each of the touch nodes changes according to the first driving signal of the first frequency band and a body touch. Accordingly, the touch sensing circuit 400 may measure a change in the capacitance of each of the touch nodes according to a change in the voltage magnitude or current amount of a touch sensing signal detected in the first frequency band. In this way, the touch sensing circuit 400 may determine whether a user's touch or proximity has occurred based on a charge change in the mutual capacitance of each of the touch nodes of the touch sensing unit TSU during the touch electrode driving period. Here, the user's touch indicates that a body part such as the user's finger directly touches a surface of the cover window disposed on the touch sensing unit TSU. The user's proximity indicates that the user's body part hovers above a surface of the cover window (e.g., without directly touching the surface of the cover window).

Since the touch driving signal in which the first driving signal of the first frequency band for sensing a touch of a body part and the second driving signal of the second frequency band for sensing a touch of an electronic pen are mixed is transmitted to the touch electrodes during the touch electrode driving period, when the electronic pen touches the touch sensing unit TSU during the touch electrode driving period, the electronic pen may be charged by the second driving signal of the second frequency band.

The touch sensing circuit 400 detects touch sensing signals of the second frequency band output from the touch electrodes during a sensing signal detection period after the touch electrode driving period. Then, the touch sensing circuit 400 may determine whether an electronic pen is in proximity and a touch position of the electronic pen according to a change in the amplitude of each of the touch sensing signals detected in the second frequency band during the sensing signal detection period.

As described above, the touch sensing circuit 400 may supply a touch driving signal in which the first and second frequency bands are mixed to the touch electrodes during a touch electrode driving period so as to detect a user's body part and charge an electronic pen during the touch electrode driving period. According to embodiments, the electronic pen may be optionally charged during the touch electrode driving period. That is, according to embodiments, the electronic pen is capable of being charged during the touch electrode driving period, and the electronic pen may or may not be charged during the touch electrode driving period depending on other variables (e.g., current battery level of the electronic pen). That is, according to embodiments, the electronic pen is allowed/permitted to be charged during the touch electrode driving period, and may or may not be charged during the touch electrode driving period depending on current variables. In addition, the touch sensing circuit 400 may detect whether the electronic pen is in proximity and a touch position of the electronic pen according to a change in the amplitude of each touch sensing signal detected during a sensing signal detection period.

The electronic pen may be a stylus pen that supports electromagnetic resonance through at least one pair of electrodes and a coil connected to the at least one pair of electrodes. The electronic pen may be charged in response to a magnetic field or electromagnetic signal of the touch sensing unit TSU and may output a radio frequency signal when discharged.

Figure 4:
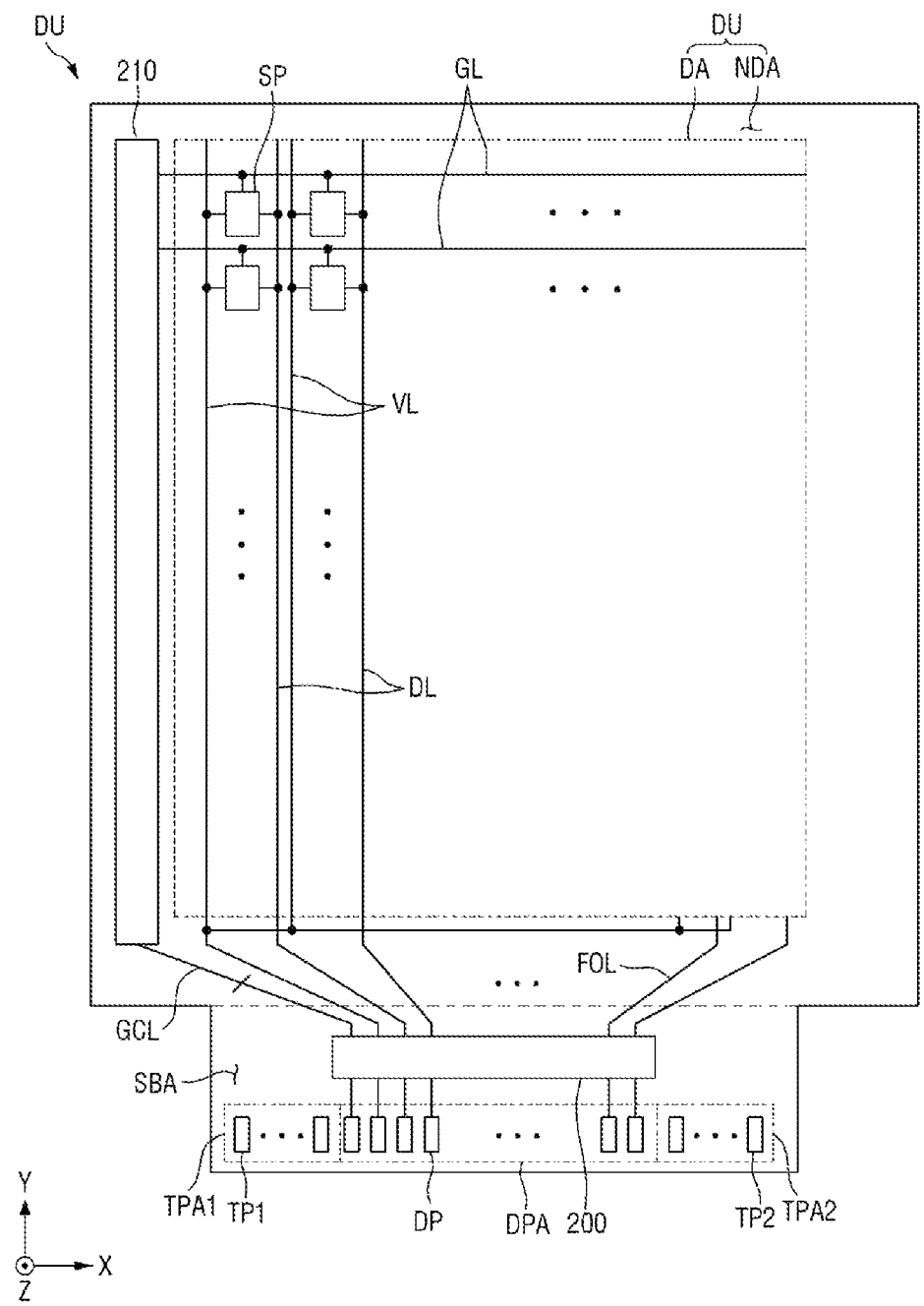
FIG. 4 is a schematic layout view of an example of a display panel illustrated in FIGS. 1 through 3 according to an embodiment.

FIG. 4 is a schematic layout view of an example of the display panel 100 illustrated in FIGS. 1 through 3 according to an embodiment. For example, FIG. 4 is a layout view illustrating the display area DA and the non-display area NDA of the display module DU before the touch sensing unit TSU is formed.

The display area DA is an area in which an image is displayed and may be defined as a central area of the display panel 100. The display area DA may include a plurality of pixels SP, a plurality of gate lines GL, a plurality of data lines DL, and a plurality of power lines VL. Each of the pixels SP may be defined as a minimum unit that outputs light.

The gate lines GL may supply gate signals received from a gate driver 210 to the pixels SP. The gate lines GL may extend in the X-axis direction and may be spaced apart from each other in the Y-axis direction intersecting the X-axis direction (e.g., the gate lines GL may be arranged in the Y-axis direction).

The data lines DL may supply data voltages received from the display driving circuit 200 to the pixels SP. The data lines DL may extend in the Y-axis direction and may be spaced apart from each other in the X-axis direction (e.g., the data lines DL may be arranged in the X-axis direction).

The power lines VL may supply a power supply voltage received from the display driving circuit 200 to the pixels SP. Here, the power supply voltage may be at least one of, for example, a driving voltage, an initialization voltage, and a reference voltage. The power lines VL may extend in the Y-axis direction and may be spaced apart from each other in the X-axis direction (e.g., the power lines VL may be arranged in the X-axis direction).

The non-display area NDA may surround the display area DA. The non-display area NDA may include the gate driver 210, fan-out lines FOL, and gate control lines GCL. The gate driver 210 may generate a plurality of gate signals based on a gate control signal and may sequentially supply the gate signals to the gate lines GL according to a set order.

The fan-out lines FOL may extend from the display driving circuit 200 to the display area DA. The fan-out lines FOL may supply data voltages received from the display driving circuit 200 to the data lines DL.

The gate control lines GCL may extend from the display driving circuit 200 to the gate driver 210. The gate control lines GCL may supply the gate control signal received from the display driving circuit 200 to the gate driver 210.

The sub-area SBA may include the display driving circuit 200, a display pad area DPA, and first and second touch pad areas TPA1 and TPA2.

The display driving circuit 200 may output timing control signals and data voltages for driving the display panel 100 to the fan-out lines FOL. The display driving circuit 200 generates timing control signals according to a preset display driving frequency based on display control firmware and generates data voltages corresponding to image data. Then, the display driving circuit 200 may supply the data voltages to the data lines DL through the fan-out lines FOL according to the display driving frequency set in firmware. Here, the data voltages may be supplied to the pixels SP and may determine luminances of the pixels SP. In addition, the display driving circuit 200 may supply the timing control signals generated according to the display driving frequency of the firmware and gate voltage values to the gate driver 210 through the gate control lines GCL.

The display pad area DPA, the first touch pad area TPA1, and the second touch pad area TPA2 may be disposed at an edge of the sub-area SBA. The display pad area DPA, the first touch pad area TPA1, and the second touch pad area TPA2 may be electrically connected to the display circuit board 300 using, for example, an anisotropic conductive film or a low-resistance high-reliability material such as SAP.

The display pad area DPA may include a plurality of display pad units. The display pad units may be connected to a main processor such as a graphics card through the display circuit board 300. The display pad units may be connected to the display circuit board 300, and may receive digital video data and may supply the digital video data to the display driving circuit 200.

Figure 5:
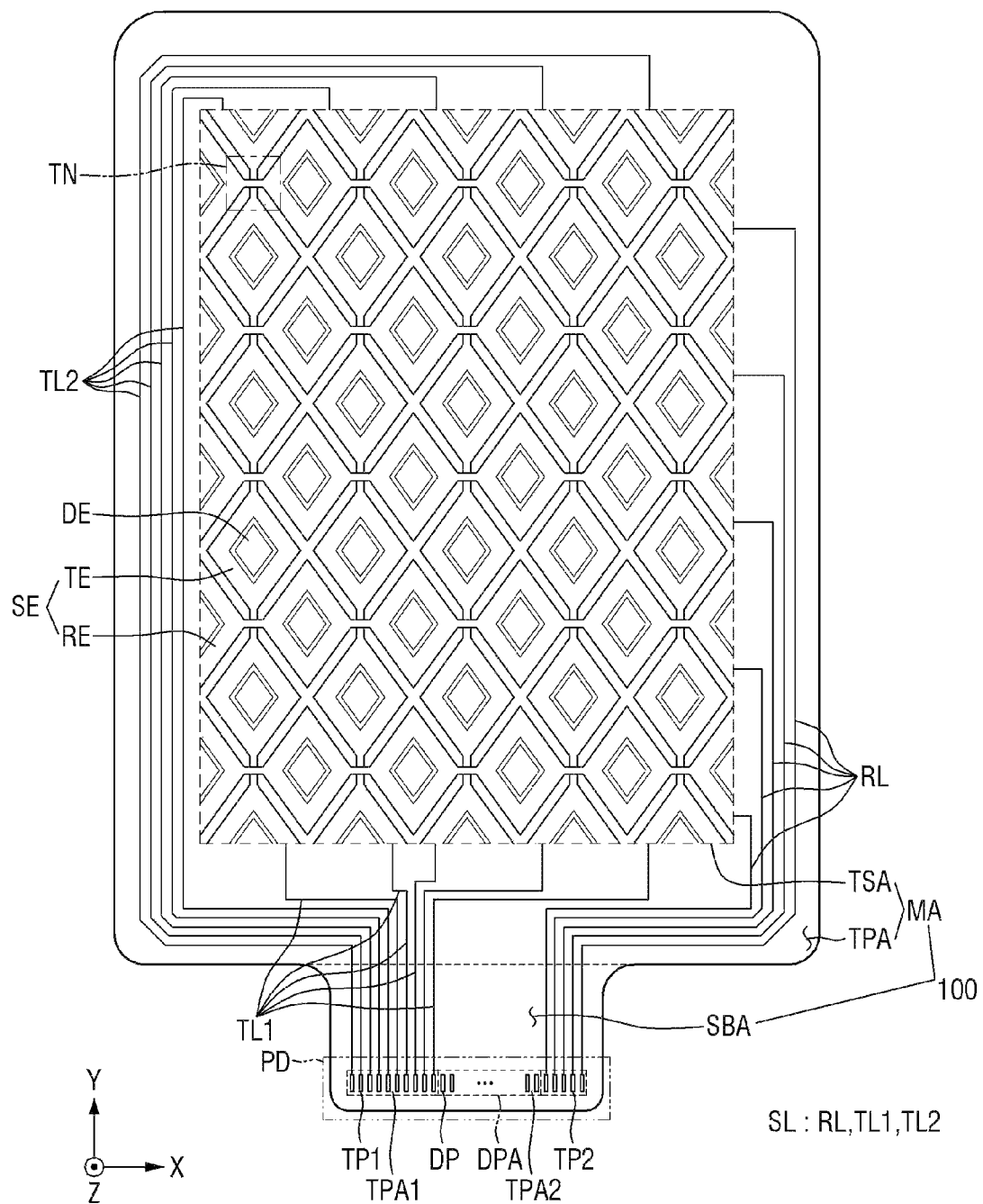
FIG. 5 is a schematic layout view of an example of a touch sensing unit illustrated in FIG. 3 according to an embodiment.

FIG. 5 is a schematic layout view of an example of the touch sensing unit TSU illustrated in FIG. 3 according to an embodiment.

In FIG. 5, a structure in which touch electrodes SE of the main area MA include two types of electrodes, for example, driving electrodes TE and sensing electrodes RE, will be described as an example. In a mutual capacitance method, when a touch driving signal in which the first and second driving signals of the first and second frequency bands are mixed is transmitted to the driving electrodes TE during a touch electrode driving period, a charge change in the mutual capacitance of each of a plurality of touch nodes is sensed through the sensing electrodes RE. A case in which the touch sensing unit TSU is driven using the mutual capacitance method will be mainly described below, but embodiments of the present disclosure are not limited thereto. In addition, in an electronic pen discharge amount sensing method, a touch input of an electronic pen is detected according to a change in the amplitude of each of sensing signals transmitted through the sensing electrodes RE during a sensing signal detection period after the touch electrode driving period. The electronic pen discharge amount sensing method will also be described as an example, but embodiments of the present disclosure are not limited thereto.

In FIG. 5, only the driving electrodes TE, the sensing electrodes RE, dummy patterns DE, touch lines SL, and first and second touch pads TP1 and TP2 are illustrated for ease of description.

Referring to FIG. 5, the main area MA of the touch sensing unit TSU includes a touch sensing area TSA in which a user's touch is sensed and a touch peripheral area TPA disposed around the touch sensing area TSA. The touch sensing area TSA may overlap the display area DA of FIGS. 1 through 3, and the touch peripheral area TPA may overlap the non-display area NDA.

The driving electrodes TE, the sensing electrodes RE, and the dummy patterns DE are disposed in the touch sensing area TSA. The driving electrodes TE and the sensing electrodes RE may be electrodes for forming mutual capacitance to sense touches of an electronic pen and a user's body part.

The sensing electrodes RE may be arranged side by side in the first direction (X-axis direction) and the second direction (Y-axis direction). The sensing electrodes RE may be electrically connected to each other in the first direction (X-axis direction). The sensing electrodes RE adjacent to each other in the first direction (X-axis direction) may be connected to each other. The sensing electrodes RE adjacent to each other in the second direction (the Y-axis direction) may be electrically isolated from each other. Accordingly, a touch node TN having mutual capacitance may be disposed at each of the intersections of the driving electrodes TE and the sensing electrodes RE. The touch nodes TN may correspond to the intersections of the driving electrodes TE and the sensing electrodes RE.

The driving electrodes TE may be arranged side by side in the first direction (X-axis direction) and the second direction (Y-axis direction). The driving electrodes TE adjacent to each other in the first direction (X-axis direction) may be electrically isolated from each other. The driving electrodes TE may be electrically connected to each other in the second direction (Y-axis direction). The driving electrodes TE adjacent to each other in the second direction (Y-axis direction) may be connected to each other through a connection electrode.

Each of the dummy patterns DE may be surrounded by a driving electrode TE or a sensing electrode RE. Each of the dummy patterns DE may be electrically isolated from the driving electrode TE or the sensing electrode RE. Each of the dummy patterns DE may be spaced apart from the driving electrode TE or the sensing electrode RE. Each of the dummy patterns DE may be electrically floating.

Although each of the driving electrodes TE, the sensing electrodes RE, and the dummy patterns DE has a rhombic planar shape in FIG. 5, embodiments of the present disclosure are not limited thereto. For example, each of the driving electrodes TE, the sensing electrodes RE, and the dummy patterns DE may also be shaped as, for example, a quadrilateral other than a rhombus, a polygon other than a quadrilateral, a circle, or an oval in a plan view.

The touch lines SL may be disposed in the sensor peripheral area TPA. The touch lines SL include first touch driving lines TL1 and second touch driving lines TL2 connected to the driving electrodes TE and touch sensing lines RL connected to the sensing electrodes RE.

The sensing electrodes RE disposed at an end of the touch sensing area TSA may be connected one-to-one to the touch sensing lines RL. As used herein, the term one-to-one refers to a one-to-one correspondence. For example, rightmost sensing electrodes RE among the sensing electrodes RE electrically connected to each other in the first direction (X-axis direction) may be respectively connected to the touch sensing lines RL as illustrated in FIG. 5. In addition, the touch sensing lines RL may be connected one-to-one to the second touch pads TP2 disposed in a pad unit PD.

The driving electrodes TE disposed at an end of the touch sensing area TSA may be connected one-to-one to the first touch driving lines TL1, and the driving electrodes TE disposed at the other end of the touch sensing area TSA may be connected one-to-one to the second touch driving lines TL2. For example, lowermost driving electrodes TE among the driving electrodes TE electrically connected to each other in the second direction (Y-axis direction) may be connected to the first touch driving lines TL1, respectively, and uppermost driving electrodes TE may be connected to the second touch driving lines TL2, respectively. The second touch driving lines TL2 may pass a left side of the touch sensing area TSA and then may be connected to the driving electrodes TE on an upper side of the touch sensing area TSA.

The first touch driving lines TL1 and the second touch driving lines TL2 may be connected one-to-one to the first touch pads TP1 disposed in the pad unit PD. The driving electrodes TE are connected to the first and second touch driving lines TL1 and TL2 on both sides of the touch sensing area TSA to receive touch driving signals. Therefore, a difference between a touch driving signal transmitted to the driving electrodes TE disposed on a lower side of the touch sensing area TSA and a touch driving signal transmitted to the driving electrodes TE disposed on the upper side of the touch sensing area TSA may be prevented from occurring due to the resistive-capacitive (RC) delay of the touch driving signals.

When the display circuit board 300 is connected to a side of the display panel 100 as illustrated in FIGS. 1 through 3, the display pad area DPA and the first and second touch pad areas TPA1 and TPA2 of the pad unit PD may correspond to pads of the display circuit board 300 connected to the display panel 100. Therefore, the pads of the display panel 100 may be placed on display pads DP, the first touch pads TP1 and the second touch pads TP2 to contact the pads. The display pads DP, the first touch pads TP1, and the second touch pads TP2 may be electrically connected to the pads of the display circuit board 300 using, for example, an anisotropic conductive film or a low-resistance high-reliability material such as SAP. Therefore, the display pads DP, the first touch pads TP1, and the second touch pads TP2 may be electrically connected to the touch sensing circuit 400 disposed on the display circuit board 300.

The touch sensing circuit 400 generates touch driving signals by mixing the first and second driving signals of the first and second frequency bands, and supplies the touch driving signals to the driving electrodes TE from leftmost driving electrodes TE to rightmost driving electrodes TE in the touch sensing area TSA. Here, the touch sensing circuit 400 may simultaneously supply the touch driving signals to the driving electrodes TE arranged in the second direction (Y-axis direction). Alternatively, the touch sensing circuit 400 may sequentially supply the touch driving signals to the driving electrodes TE from the leftmost driving electrodes TE to the rightmost driving electrodes TE in the second direction (Y-axis direction).

Alternatively, the touch sensing circuit 400 may divide the driving electrodes TE into a preset number of groups according to programming of touch driving firmware and sequentially output the touch driving signals to each group of driving electrodes TE. Here, the touch driving signals may be supplied as a plurality of pulse signals generated with a magnitude of about −12 V to about 12 V based on a driving voltage value of the firmware.

The touch sensing circuit 400 receives touch sensing signals of the first frequency band from the sensing electrodes RE through the touch sensing lines RL connected to the sensing electrodes RE. The touch sensing circuit 400 may measure a change in the capacitance of each of the touch nodes through the touch sensing signals of the first frequency band output from the sensing electrodes RE during a touch electrode driving period, and detect the presence of a user' touch and a touch position.

Then, the touch sensing circuit 400 receives touch sensing signals of the second frequency band from the driving electrodes TE through the first or second touch driving lines TL1 and TL2 during a sensing signal detection period. The touch sensing circuit 400 determines whether an electronic pen is in proximity and a touch position of the electronic pen according to a change in the amplitude of each of the touch sensing signals detected in the second frequency band. In addition, the touch sensing circuit 400 may receive touch sensing signals of the second frequency band from the sensing electrodes RE during the sensing signal detection period. The touch sensing circuit 400 may also determine whether the electronic pen is in proximity and the touch position of the electronic pen according to a change in the amplitude of each of the touch sensing signals of the second frequency band from the sensing electrodes RE.

Figure 6:
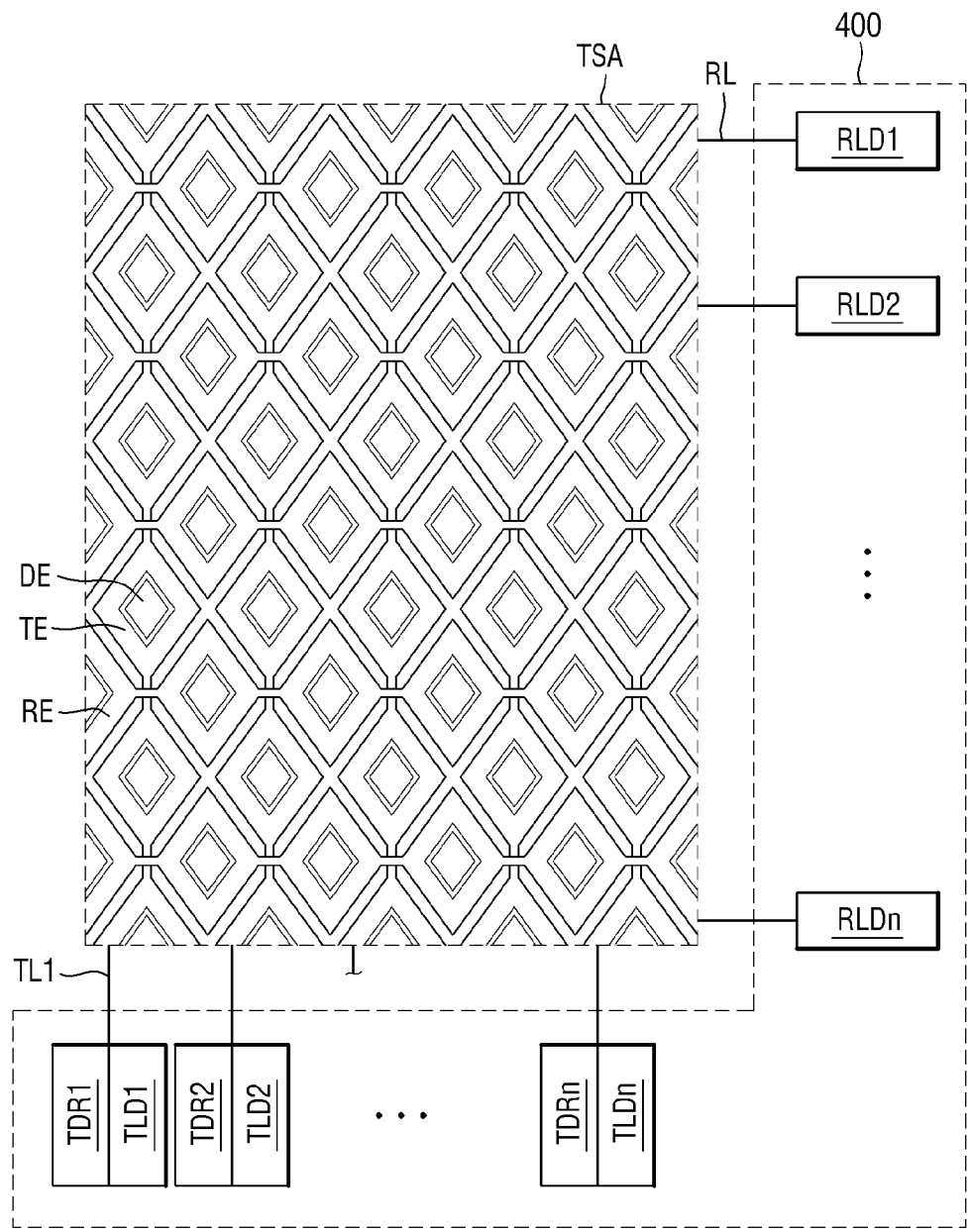
FIG. 6 is a layout view illustrating an electrical connection structure between touch electrodes illustrated in FIG. 5 and a touch sensing circuit according to an embodiment.

FIG. 6 is a layout view illustrating an electrical connection structure between the touch electrodes SE illustrated in FIG. 5 and the touch sensing circuit 400 according to an embodiment.

Referring to FIG. 6, the touch sensing circuit 400 includes a plurality of driving signal supply circuit units TDR1 through TDRn, a plurality of signal analysis circuit units TLD1 through TLDn, and a plurality of sensing signal analysis circuit units RLD1 through RLDn. Here, n is a positive integer.

The driving signal supply circuit units TDR1 through TDRn may be selectively connected to odd-numbered driving electrodes TE or odd-numbered groups of driving electrodes TE of the touch sensing area TSA through odd-numbered first touch driving lines TL1 and switches. The driving signal supply circuit units TDR1 through TDRn may also be selectively connected to the odd-numbered driving electrodes TE or the odd-numbered groups of driving electrodes TE of the touch sensing area TSA through odd-numbered groups of first or second touch driving lines TL1 or TL2 and switches.

Alternatively, the driving signal supply circuit units TDR1 through TDRn may be selectively connected to even-numbered driving electrodes TE or even-numbered groups of driving electrodes TE of the touch sensing area TSA through even-numbered first touch driving lines TL1 and switches. The driving signal supply circuit units TDR1 through TDRn may also be selectively connected to the even-numbered driving electrodes TE or the even-numbered groups of driving electrodes TE of the touch sensing area TSA through even-numbered groups of first or second touch driving lines TL1 or TL2 and switches.

A case in which the driving signal supply circuit units TDR1 through TDRn are selectively connected to the odd-numbered driving electrodes TE or the odd-numbered groups of driving electrodes TE of the touch sensing area TSA through the odd-numbered first touch driving lines TL1 during a touch electrode driving period will be described below as an example.

The driving signal supply circuit units TDR1 through TDRn may supply touch driving signals generated by mixing the first and second driving signals of the first and second frequency bands to the odd-numbered touch electrodes TE or the odd-numbered groups of touch electrodes TE of the touch sensing area TSA during the touch electrode driving period.

The driving signal supply circuit units TDR1 through TDRn may sequentially operate from a first driving signal supply circuit unit TDR1 to an $n^{th}$ driving signal supply circuit unit TDRn to supply the touch driving signals to the odd-numbered driving electrodes TE from the odd-numbered driving electrodes TE arranged on a side of the touch sensing area TSA to the odd-numbered driving electrodes TE arranged on the other side of the touch sensing area TSA. Alternatively, odd-numbered driving supply units TDR1, TDR3, . . . TDRn−1 or odd-numbered groups of driving signal supply circuit units TDR1, TDR3, . . . TDRn−1 may simultaneously supply the touch driving signals to the odd-numbered driving electrodes TE or the odd-numbered groups of driving electrodes TE.

In addition, the driving signal supply circuit units TDR1 through TDRn may divide the driving electrodes TE into a preset number of groups and sequentially supply the touch driving signals to each odd-numbered or even-numbered group of driving electrodes TE.

The sensing signal analysis circuit units RLD1 through RLDn are connected one-to-one to the sensing electrodes RE of the touch sensing area TSA through the touch sensing lines RL, respectively.

The sensing signal analysis circuit units RLD1 through RLDn detect touch sensing signals of the first frequency band respectively output from the sensing electrodes RE during the touch electrode driving period, and detect a change in the voltage magnitude of each of the touch sensing signals. For example, the sensing signal analysis circuit units RLD1 through RLDn may measure a charge change in mutual capacitance applied to each touch node according to a change in the current amount or voltage magnitude of each of the touch sensing signals sequentially or simultaneously output from the sensing electrodes RE during the touch electrode driving period.

In addition, the sensing signal analysis circuit units RLD1 through RLDn may detect touch sensing signals of the second frequency band respectively output from the sensing electrodes RE during a sensing signal detection period after the touch electrode driving period and detect a change in the amplitude of each of the touch sensing signals. For example, the sensing signal analysis circuit units RLD1 through RLDn may detect a touch and a touch position of an electronic pen according to a change in the amplitude of each of the touch sensing signals sequentially or simultaneously output from the sensing electrodes RE during the sensing signal detection period.

The signal analysis circuit units TLD1 through TLDn may be selectively connected to the even-numbered driving electrodes TE of the touch sensing area TSA through the even-numbered first touch driving lines TL1 and switches. The signal analysis circuit units TLD1 through TLDn may also be selectively connected to the even-numbered driving electrodes TE or the even-numbered groups of driving electrodes TE of the touch sensing area TSA through the even-numbered groups of first or second touch driving lines TL1 through TL2 and switches.

Alternatively, the signal analysis circuit units TLD1 through TLDn may be selectively connected to the odd-numbered driving electrodes TE of the touch sensing area TSA through the odd-numbered first touch driving lines TL1 and switches. The signal analysis circuit units TLD through TLDn may also be selectively connected to the odd-numbered driving electrodes TE or the odd-numbered groups of driving electrodes TE of the touch sensing area TSA through the odd-numbered groups of first or second touch driving lines TL1 or TL2 and switches.

A case in which the signal analysis circuit units TLD1 through TLDn are selectively connected to the even-numbered driving electrodes TE or the even-numbered groups of driving electrodes TE during the sensing signal detection period will be described below as an example.

The signal analysis circuit units TLD1 through TLDn detect touch sensing signals of the second frequency band output from the even-numbered driving electrodes TE or the even-numbered groups of driving electrodes TE during the sensing signal detection period and detect a change in the amplitude of each of the touch sensing signals. For example, the signal analysis circuit units TLD1 through TLDn may detect a touch and a touch position of an electronic pen according to a change in the amplitude of each of the touch sensing signals sequentially or simultaneously output from the even-numbered driving electrodes TE or the even-numbered groups of driving electrodes TE during the sensing signal detection period.

The signal analysis circuit units TLD1 through TLDn may detect a change in the amplitude of each of the touch sensing signals sequentially input to the signal analysis circuit units TLD1 through TLDn from a first signal analysis circuit unit TLD1 to an $n^{th}$ signal analysis circuit unit TLDn. Alternatively, the signal analysis circuit units TLD1 through TLDn may detect a change in the amplitude of each of the touch sensing signals simultaneously input through the even-numbered driving electrodes TE or the even-numbered groups of driving electrodes TE. The signal analysis circuit units TLD1 through TLDn may also detect a change in the amplitude of each of the touch sensing signals sequentially input from each odd-numbered or even-numbered group of driving electrodes TE.

Figure 7:
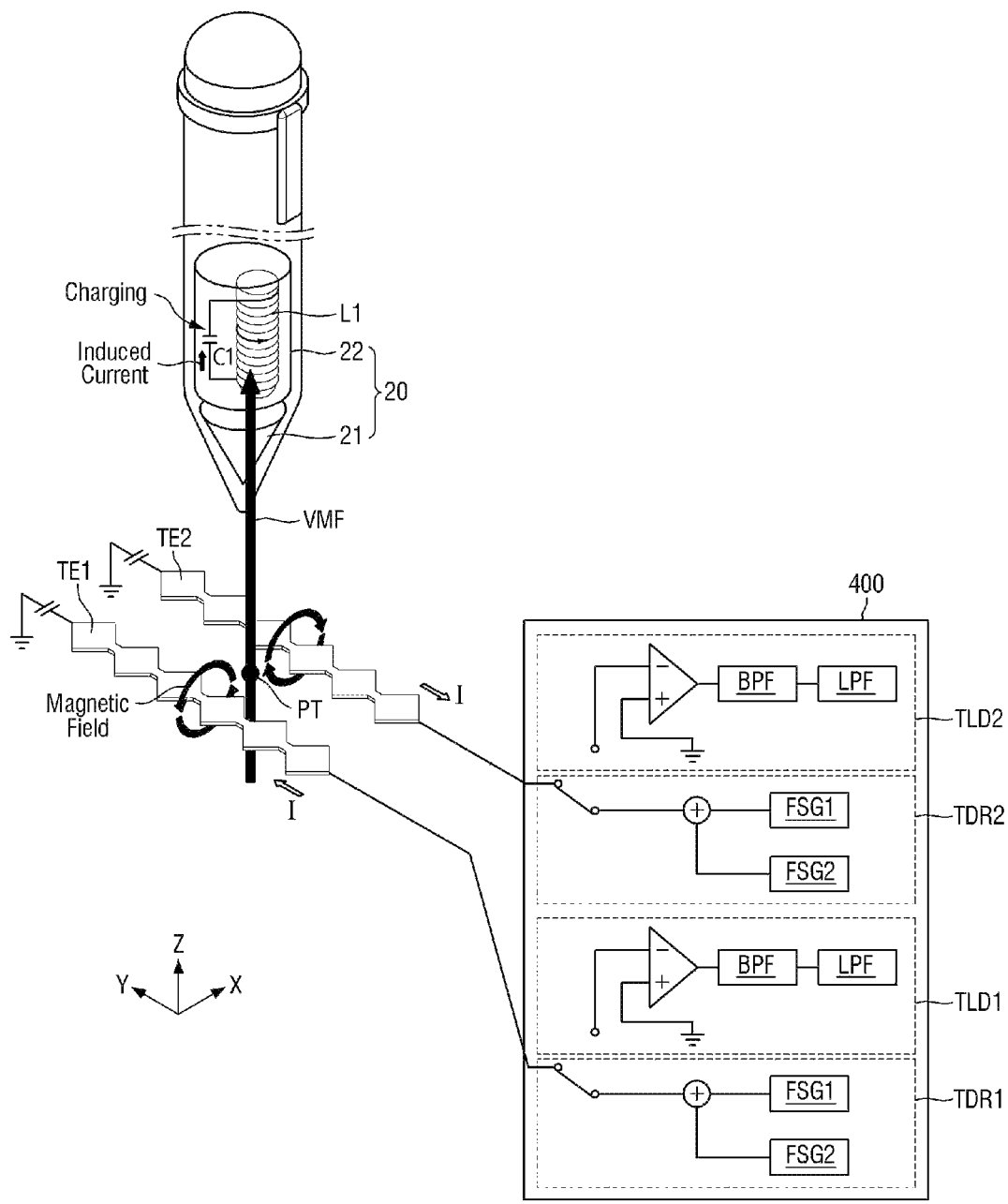
FIG. 7 is a configuration diagram illustrating a touch driving operation of a touch sensing system and a charging operation of an electronic pen according to an embodiment.

FIG. 7 is a configuration diagram illustrating a touch driving operation of a touch sensing system and a charging operation of an electronic pen 20 according to an embodiment.

Referring to FIG. 7, the driving signal supply circuit units TDR1 through TDRn supply touch driving signals generated by mixing the first and second driving signals of the first and second frequency bands to the odd-numbered driving electrodes TE or the odd-numbered groups of driving electrodes TE of the touch sensing area TSA during a touch electrode driving period.

To this end, each of the driving signal supply circuit units TDR1 through TDRn may include a first signal generation unit FSG1 that generates the first driving signal of the first frequency band, a second signal generation unit FSG2 that generates the second driving signal of the second frequency band, and a mixed signal output unit that mixes the first and second driving signals and outputs the mixed first and second driving signals as a touch driving signal. The touch driving signal in which the first and second driving signals of the first and second frequency bands are mixed may be, but is not limited to, a sine wave, a pulse wave, a triangular wave, or a ramp wave. For example, the second frequency band of the second driving signal may correspond to a resonant frequency of the electronic pen 20. For example, the second frequency band of the second driving signal may be the same as a resonant frequency of a resonant circuit unit 22 included in the electronic pen 20, but embodiments of the present disclosure are not limited thereto.

A magnetic field may be generated between the odd-numbered driving electrodes TE or the odd-numbered groups of driving electrodes TE and the even-numbered driving electrodes TE or the even-numbered groups of driving electrodes TE according to the direction of a current flow. For example, a magnetic field may be formed between odd-numbered driving electrodes TE1 and even-numbered driving electrodes TE2 according to the direction of the current flow. To this end, any one side of the odd-numbered driving electrodes TE1 and the even-numbered driving electrodes TE2 may form a capacitor with a ground or a low-potential voltage source. According to an embodiment, at least one coupling capacitor may be additionally formed between the odd-numbered driving electrodes TE or the odd-numbered groups of driving electrodes TE and the even-numbered driving electrodes TE or the even-numbered groups of driving electrodes TE. For example, coupling capacitors may be formed between the odd-numbered driving electrodes TE or the odd-numbered groups of driving electrodes TE and the even-numbered driving electrodes TE or the even-numbered groups of driving electrodes TE so that the driving electrodes TE can be used as touch electrodes for sensing a user's body touch.

The electronic pen 20 may include a conductive tip 21 and the resonant circuit unit 22. The conductive tip 21 may be disposed at an end of the electronic pen 20. Accordingly, when the electronic pen 20 touches the touch sensing unit TSU, the conductive tip 21 may form capacitance with at least one of the odd-numbered driving electrodes TE1 and the even-numbered driving electrodes TE2. The conductive tip 21 may be, but is not limited to, a metal material or a dielectric including conductive rubber.

The resonant circuit unit 22 may include a coil L1 and a capacitor C1. When the conductive tip 21 of the electronic pen 20 is adjacent to or in contact with a specific point PT, the coil L1 may receive a magnetic field VMF induced in the third direction (Z-axis direction) by at least one odd-numbered driving electrode TE1 and generate an induced current. The induced current flowing through the resonant circuit unit 22 may charge the capacitor C1. For example, an LC resonant frequency of the electronic pen 20 may be determined based on the capacitance of the capacitor C1 and the inductance of the coil L1. For example, the coil L1 of the electronic pen 20 may generate an induced current, and the induced current may charge the capacitor C1. Accordingly, an electromotive force of the capacitor C1 may increase during a charging period of the coil L1.

According to an embodiment, during the touch electrode driving period, the signal analysis circuit units TLD1 through TLDn may be kept electrically cut off from the even-numbered driving electrodes or the even-numbered groups of driving electrodes TE.

On the other hand, during the touch electrode driving period, the sensing signal analysis circuit units RLD1 through RLDn may detect a touch start of a user's body part or the presence of a touch by detecting touch sensing signals of the first frequency band respectively output from the sensing electrodes RE and measuring a change in the current amount or voltage magnitude of each of the touch sensing signals.

Figure 8:
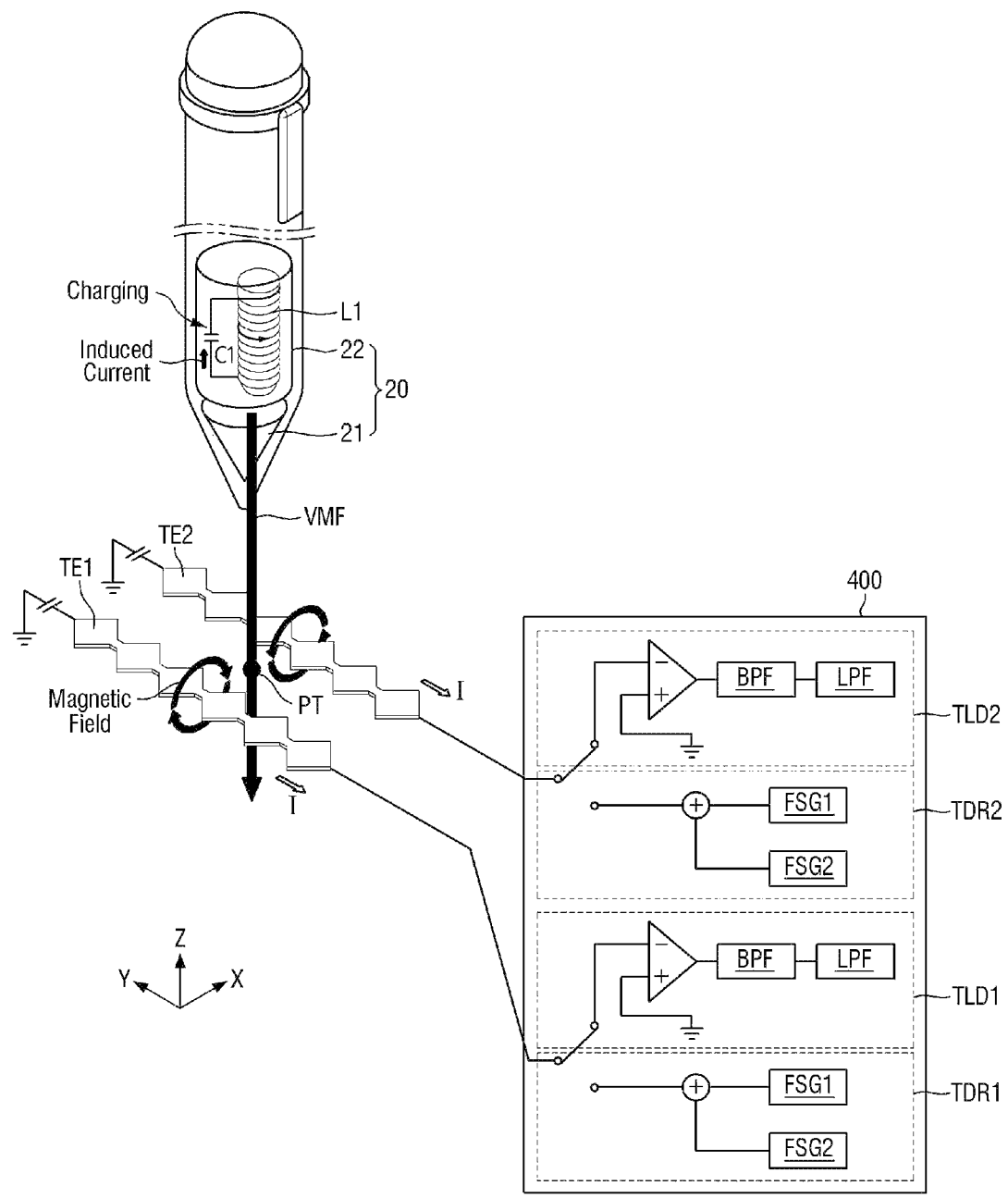
FIG. 8 is a configuration diagram illustrating a discharging operation of the electronic pen and a touch sensing signal detecting operation of the touch sensing system according to an embodiment.

FIG. 8 is a configuration diagram illustrating a discharging operation of the electronic pen 20 and a touch sensing signal detecting operation of the touch sensing system according to an embodiment.

Referring to FIG. 8, the driving signal supply circuit units TDR1 through TDRn stop outputting touch driving signals during a sensing signal detection period.

On the other hand, during the sensing signal detection period, the signal analysis circuit units TLD1 through TLDn detect touch sensing signals of the second frequency band output from the even-numbered driving electrodes TE or the even-numbered groups of driving electrodes TE and detect a change in the amplitude of each of the touch sensing signals.

For example, when the conductive tip 21 of the electronic pen 20 is adjacent to or in contact with a specific point PT in a state where the supply of the magnetic field VMF to between the odd-numbered and even-numbered driving electrodes TE is stopped, the capacitor C1 of the electronic pen 20 may be discharged. Therefore, a current in a direction opposite to the direction of an induced current may flow through the coil L1, and the coil L1 may generate the magnetic field VMF passing through the specific point PT in a direction opposite to the third direction (Z-axis direction). An electromotive force EMF of the capacitor C1 may decrease during a discharging period.

Accordingly, during the sensing signal detection period, the signal analysis circuit units TLD1 through TLDn may detect touch sensing signals of the second frequency band among the touch sensing signals output from the even-numbered driving electrodes TE or the even-numbered groups of driving electrodes TE and detect a change in the amplitude of each of the touch sensing signals.

Each of the signal analysis circuit units TLD1 through TLDn may detect a touch sensing signal of the second frequency band and measure a change in the amplitude of the detected touch sensing signal using at least one differential amplifier circuit, a band-pass filtering circuit BPF, and a low filtering circuit LPF. A touch and a touch position of the electronic pen 20 may be detected according to the measured change in the amplitude of the touch sensing signal.

According to an embodiment, the sensing signal analysis circuit units RLD1 through RLDn may also detect touch sensing signals of the second frequency band among the touch sensing signals respectively output from the sensing electrodes RE during the sensing signal detection period and measure a change in the amplitude of each of the touch sensing signals. Here, the sensing signal analysis circuit units RLD1 through RLDn may also measure the change in the amplitude of each of the touch sensing signals using a differential amplifier circuit, a band-pass filtering circuit BPF, and a low filtering circuit LPF. A touch and a touch position of the electronic pen 20 may be detected according to the measured change in the amplitude of each of the touch sensing signals.

Figure 9:
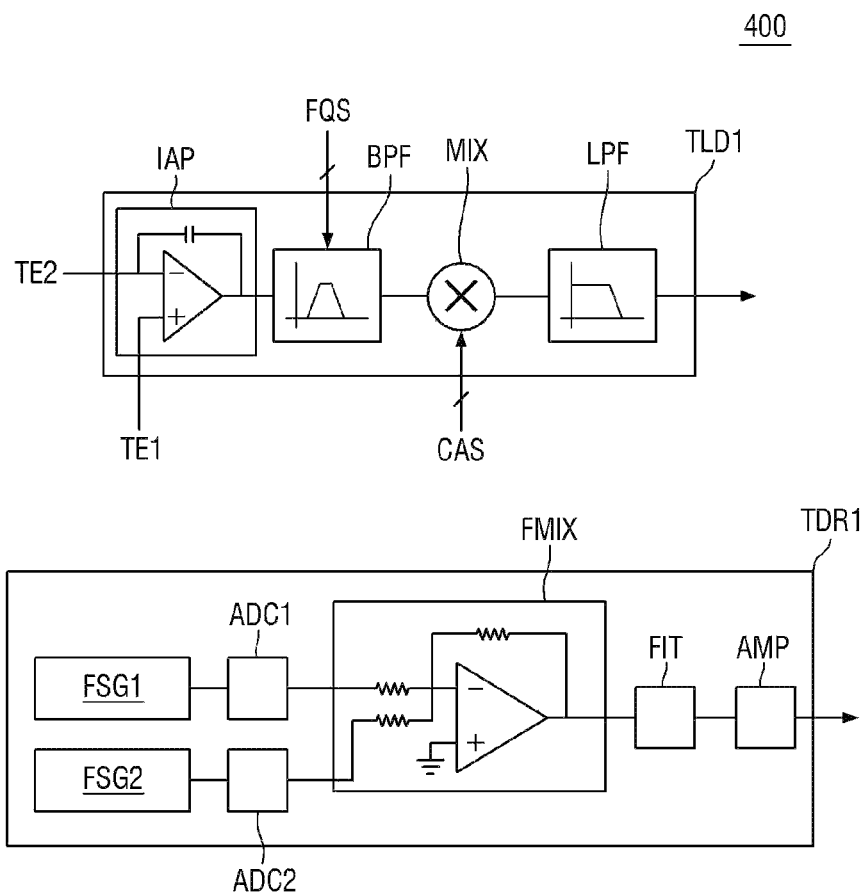
FIG. 9 is a block diagram illustrating the structure of a driving signal supply circuit unit and a touch signal detection unit illustrated in FIG. 6 according to an embodiment.

FIG. 9 is a block diagram illustrating the structure of a driving signal supply circuit unit and a touch signal detection unit illustrated in FIG. 6 according to an embodiment.

Referring to FIG. 9, each of the driving signal supply circuit units TDR1 through TDRn includes a first signal generation unit FSG1, a second signal generation unit FSG2, first and second AC conversion circuit units ADC1 and ADC2, a mixed signal output unit FMIX, a frequency filtering circuit unit FIT, and a signal stabilization output unit AMP. In the figures, FQS refers to a frequency setting signal and CAS refers to a carry signal.

The first signal generation unit FSG1 generates the first driving signal of the first frequency band, and the first AC conversion circuit unit ADC1 modulates the first driving signal into an analog signal of the first frequency band and supplies the analog signal to the mixed signal output unit FMIX.

The second signal generation unit FSG2 generates the second driving signal of the second frequency band, and the second AC conversion circuit unit ADC2 modulates the second driving signal into an analog signal of the second frequency band and supplies the analog signal to the mixed signal output unit FMIX.

The mixed signal output unit FMIX generates a touch driving signal by mixing the first driving signal of the first frequency band received from the first AC conversion circuit unit ADC1 and the second driving signal of the second frequency band received from the second AC conversion circuit unit ADC2.

The frequency filtering circuit unit FIT may filter the frequency of the touch driving signal generated and output from the mixed signal output unit FMIX within a preset maximum frequency range, and the signal stabilization output unit AMP may amplify the filtered touch driving signal within a preset voltage magnitude range and output the amplified touch driving signal to each driving electrode TE.

On the other hand, each of the signal analysis circuit units TLD1 through TLDn includes a differential amplifier circuit TAP, a band-pass filtering circuit BPF, a carry signal input circuit MIX, and a low filtering circuit.

For example, the differential amplifier circuit IAP may output a differential signal according to a voltage difference between touch sensing signals input through adjacent odd-numbered and even-numbered driving electrodes TE1 and TE2 or adjacent odd-numbered and even-numbered groups of driving electrodes TE1 and TE2.

The band-pass filtering circuit BPF may filter the differential signal of the first or second frequency band in response to a first or second frequency setting signal and output only the filtered differential signal of the first or second frequency band.

The carry signal input circuit MIX may mix a first or second carry signal received periodically with the differential signal of the first or second frequency band and output the resultant signal. As a result, touch sensing signals of the first or second frequency band can be distinguished.

The low filtering circuit may filter the differential signal of the first or second frequency band, which is mixed with the first or second carry signal, within a preset reference frequency range and output the filtered differential signal.

Figure 10:
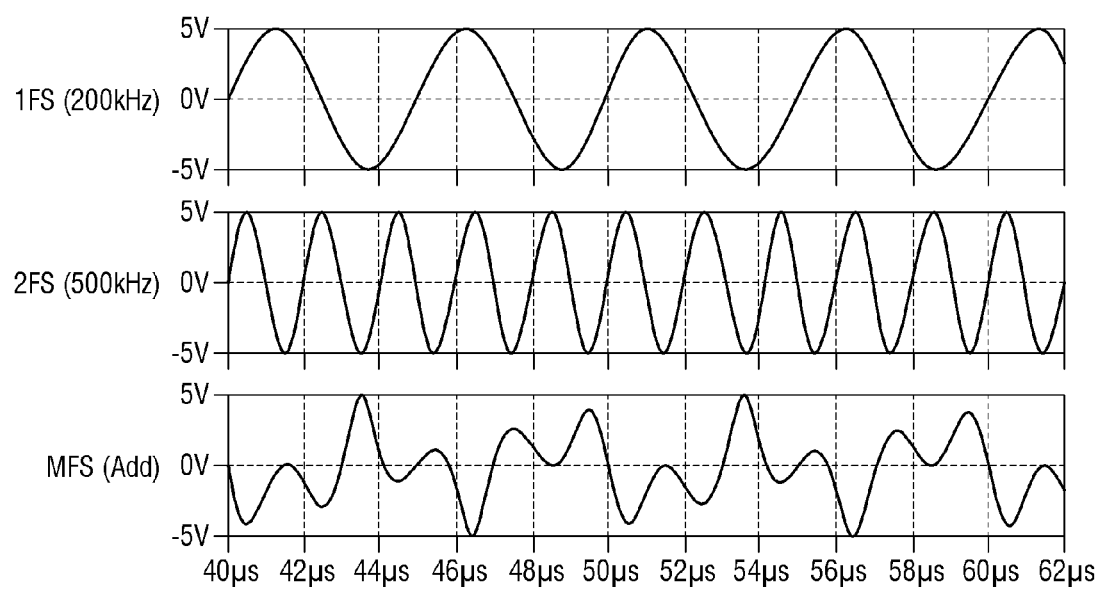
FIG. 10 is a waveform diagram of first and second driving signals and a touch driving signal generated by the driving signal supply circuit unit of FIG. 9 according to an embodiment.

FIG. 10 is a waveform diagram of first and second driving signals and a touch driving signal generated by the driving signal supply circuit unit of FIG. 9 according to an embodiment.

Referring to FIG. 10, the first AC conversion circuit unit ADC1 may output an analog signal of a frequency band of about 200 kHz, which is the first frequency band, to the mixed signal output unit FMIX as a first driving signal 1FS. Here, the 200 kHz frequency band of the first driving signal 1FS may be a resonant frequency band corresponding to a resonant frequency band set in the touch sensing circuit 400 to detect a touch of a user's body part. Accordingly, the sensing signal analysis circuit units RLD1 through RLDn may detect touch sensing signals of the first frequency band respectively output from the sensing electrodes RE during a touch electrode driving period to detect a change in the voltage magnitude of each of the touch sensing signals and detect a touch of the user's body part.

On the other hand, the second AC conversion circuit unit ADC2 may output an analog signal of a frequency band of about 500 kHz, which is the second frequency band, to the mixed signal output unit FMIX as a second driving signal 2FS. Here, the 500 kHz frequency band of the second driving signal 2FS may be the same frequency band as the resonant frequency of the resonant circuit unit 22 included in the electronic pen 20. Accordingly, the sensing signal analysis circuit units RLD1 through RLDn may detect touch sensing signals of the second frequency band respectively output from the driving electrodes TE during a sensing signal detection period to detect a touch and a touch position of the electronic pen 20.

The mixed signal output unit FMIX generates a touch driving signal MFS by mixing the first driving signal 1FS of the first frequency band received from the first AC conversion circuit unit ADC1 and the second driving signal 2FS of the second frequency band received from the second AC conversion circuit unit ADC2. Accordingly, the touch driving signal MFS may be a mixed analog signal with a frequency of about 200 kHz to about 500 kHz.

Figure 11:
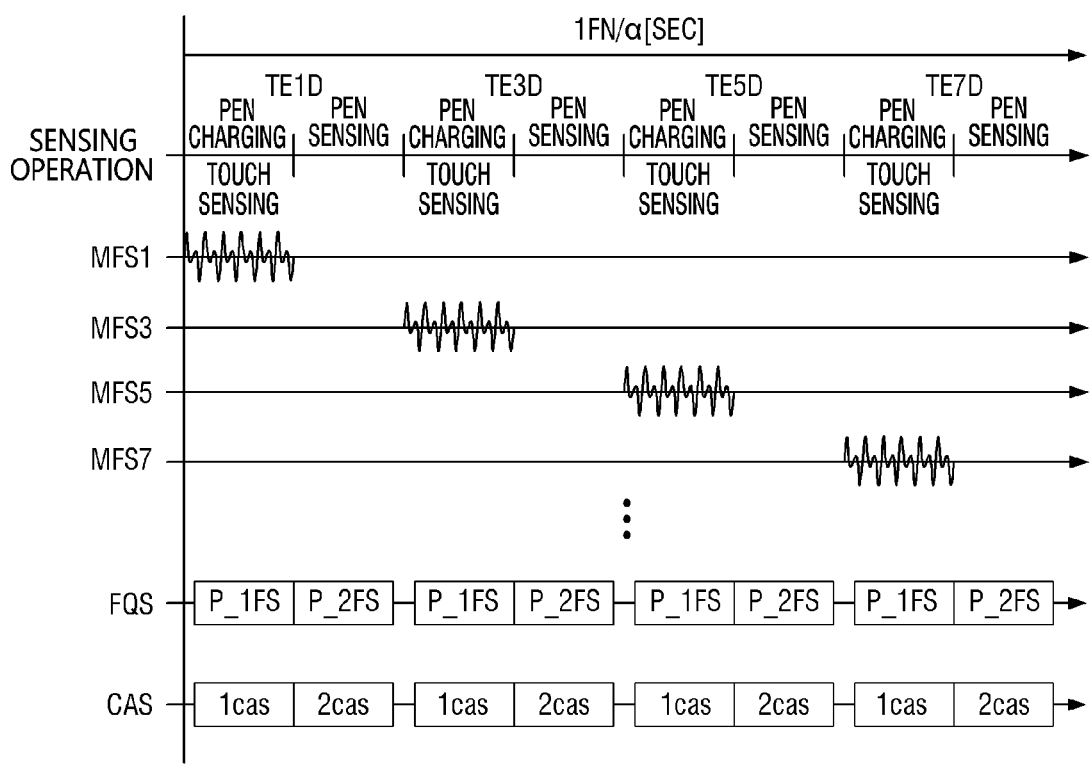
FIG. 11 is a timing diagram for explaining a method of sensing a user's touch and an electronic pen's touch according to an embodiment.

FIG. 11 is a timing diagram for explaining a method of sensing a user's touch and an electronic pen's touch according to an embodiment.

Referring to FIG. 11, the driving signal supply circuit units TDR1 through TDRn sequentially supply touch driving signals MFS1 through MFS7 generated by mixing first and second driving signals to odd-numbered driving electrodes or odd-numbered groups of driving electrodes TE1D through TE7D in each touch electrode driving period (each pen charging and touch sensing period of FIG. 11) in units of at least one frame period 1FN.

The sensing signal analysis circuit units RLD1 through RLDn may receive touch sensing signals respectively output from the sensing electrodes RE in each touch electrode driving period (each pen charging and touch sensing period of FIG. 11). Accordingly, the sensing signal analysis circuit units RLD1 through RLDn may band-pass filter the touch sensing signals in the first frequency band in response to a first frequency setting signal P_1FS and mix the filtered touch sensing signals with a first carry signal 1cas to classify the touch sensing signals as touch sensing signals for sensing a touch of a body part.

The touch sensing circuit 400 may detect a touch and a touch position of a body part by detecting a change in the magnitude of a differential signal between the touch sensing signals output through the sensing signal analysis circuit units RLD1 through RLDn in each touch electrode driving period, that is, a change in the voltage magnitude of each of the touch sensing signals.

The signal analysis circuit units TLD1 through TLDn may receive touch sensing signals output from the even-numbered driving electrodes TE or the even-numbered groups of driving electrodes TE in each sensing signal detection period pen sensing period of FIG. 11 during at least one frame period 1FN. Accordingly, the signal analysis circuit units TLD1 through TLDn may band-pass filter the touch sensing signals in the second frequency band in response to a second frequency setting signal P_2FS, and mix the filtered touch sensing signals with a second carry signal 2cas to classify the touch sensing signals as touch sensing signals for sensing a touch of the electronic pen 20.

The touch sensing circuit 400 may detect the presence of a touch and a touch start time of the electronic pen 20 by detecting a change in the amplitude of each of the touch sensing signals output through the signal analysis circuit units TLD1 through TLDn in each sensing signal detection period.

Figure 12:
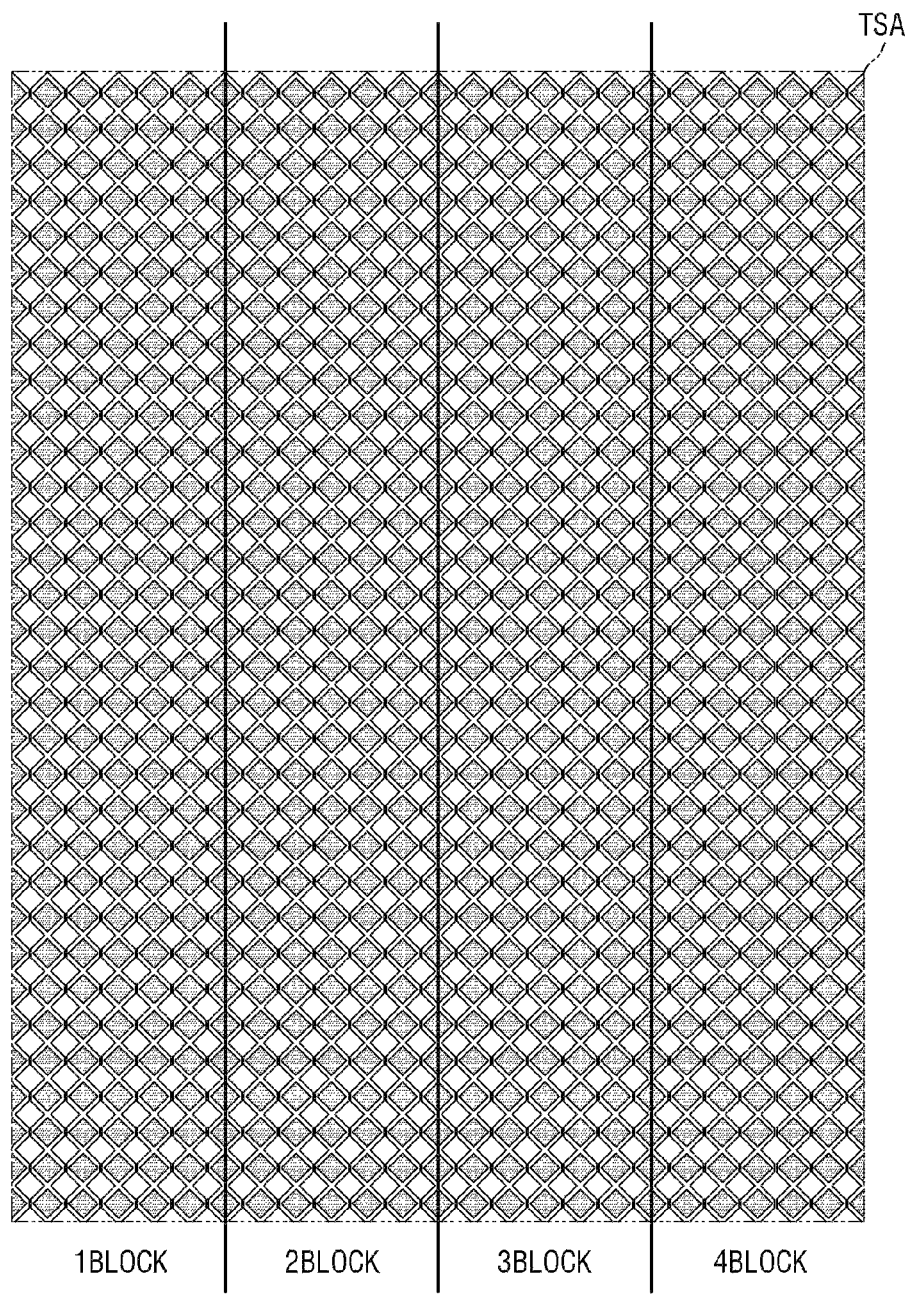
FIG. 12 is a diagram for explaining an example of split-driving a touch sensing area illustrated in FIGS. 5 and 6 according to an embodiment.
Figure 13:
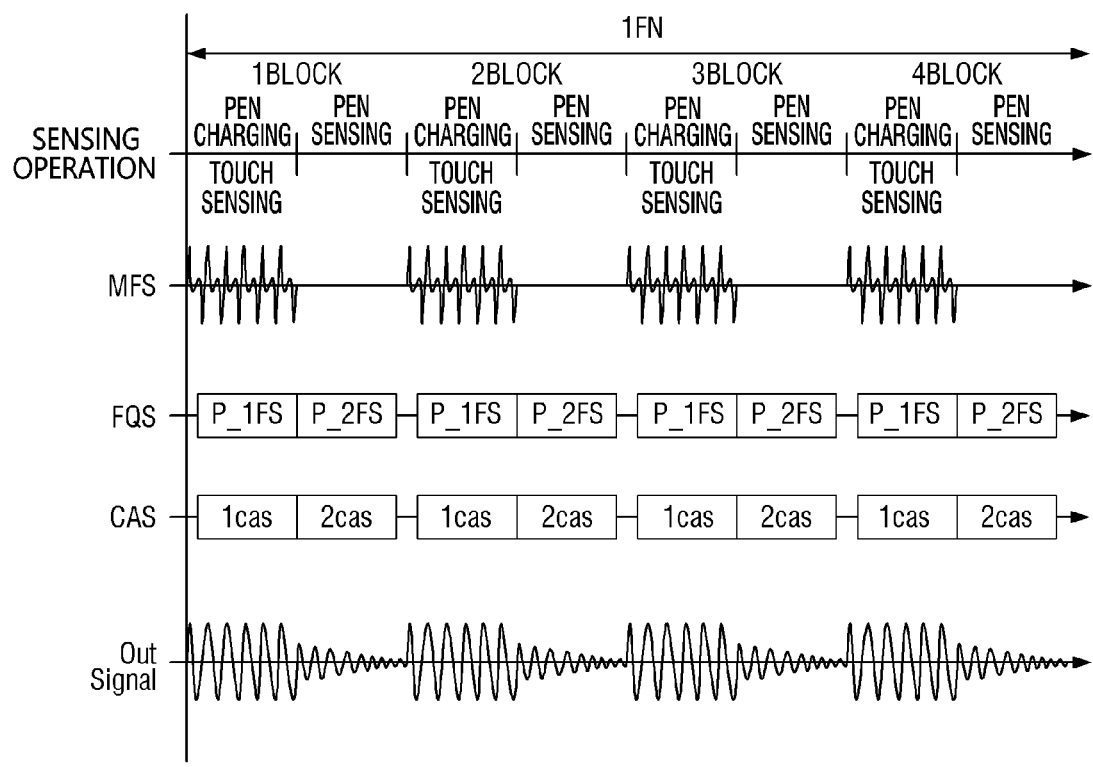
FIG. 13 is a timing diagram for explaining a method of sensing a user's touch and an electronic pen's touch according to an embodiment.

FIG. 12 is a diagram for explaining an example of split-driving the touch sensing area TSA illustrated in FIGS. 5 and 6 according to an embodiment. FIG. 13 is a timing diagram for explaining a method of sensing a user's touch and an electronic pen's touch according to an embodiment.

Referring to FIGS. 12 and 13, the touch sensing circuit 400 may split the touch sensing area TSA of the display panel 100 into a plurality of preset areas 1BLOCK through 4BLOCK. For example, the touch sensing circuit 400 may divide a plurality of driving electrodes TE arranged in the touch sensing area TSA into a plurality of groups corresponding to the areas 1BLOCK through 4BLOCK.

Accordingly, the driving signal supply circuit units TDR1 through TDRn may sequentially supply touch driving signals to the driving electrodes TE of each of the areas 1BLOCK through 4BLOCK or each group in each touch electrode driving period (each pen charging and touch sensing period of FIG. 13) during a touch detection period of each block area. Alternatively, the driving signal supply circuit units TDR1 through TDRn may simultaneously supply the touch driving signals to the driving electrodes TE of each group. For example, the driving signal supply circuit units TDR1 through TDRn may supply the touch driving signals only to the driving electrodes TE of odd-numbered groups among the groups.

The sensing signal analysis circuit units RLD1 through RLDn receive touch sensing signals respectively output from the sensing electrodes RE in each touch electrode driving period (each pen charging and touch sensing period of FIG. 13). The sensing signal analysis circuit units RLD1 through RLDn band-pass filter the touch sensing signals in the first frequency band in response to a first frequency setting signal P_1FS, and mix the filtered touch sensing signals with a first carry signal 1cas to classify the touch sensing signals as touch sensing signals for sensing a touch of a body part. Accordingly, the touch sensing circuit 400 may detect a touch and a touch position of a body part by detecting a change in the voltage magnitude of each of the touch sensing signals output through the sensing signal analysis circuit units RLD1 through RLDn in each touch electrode driving period.

The signal analysis circuit units TLD1 through TLDn receive touch sensing signals output from the even-numbered groups of driving electrodes TE in each sensing signal detection period (each pen sensing period of FIG. 13) during at least one frame period 1FN. The signal analysis circuit units TLD1 through TLDn may band-pass filter the touch sensing signals in the second frequency band in response to a second frequency setting signal P_2FS, and mix the filtered touch sensing signals with a second carry signal 2cas to classify the touch sensing signals as touch sensing signals for sensing a touch of the electronic pen 20. Accordingly, the touch sensing circuit 400 may detect the presence of a touch and a touch start time of the electronic pen 20 by detecting a change in the amplitude of each of the touch sensing signals output through the signal analysis circuit units TLD1 through TLDn in each sensing signal detection period.

According to the touch sensing methods according to embodiments described above, the presence of a touch and a touch start time of a user's body part or the electronic pen 20 may be detected. According to embodiments, in a period for detecting the touch start of the user's body part or the electronic pen 20, it is not necessary to precisely detect a touch position. Therefore, the touch start may be detected using only the driving electrodes TE or the sensing electrodes RE among the touch electrodes SE.

Figure 14:
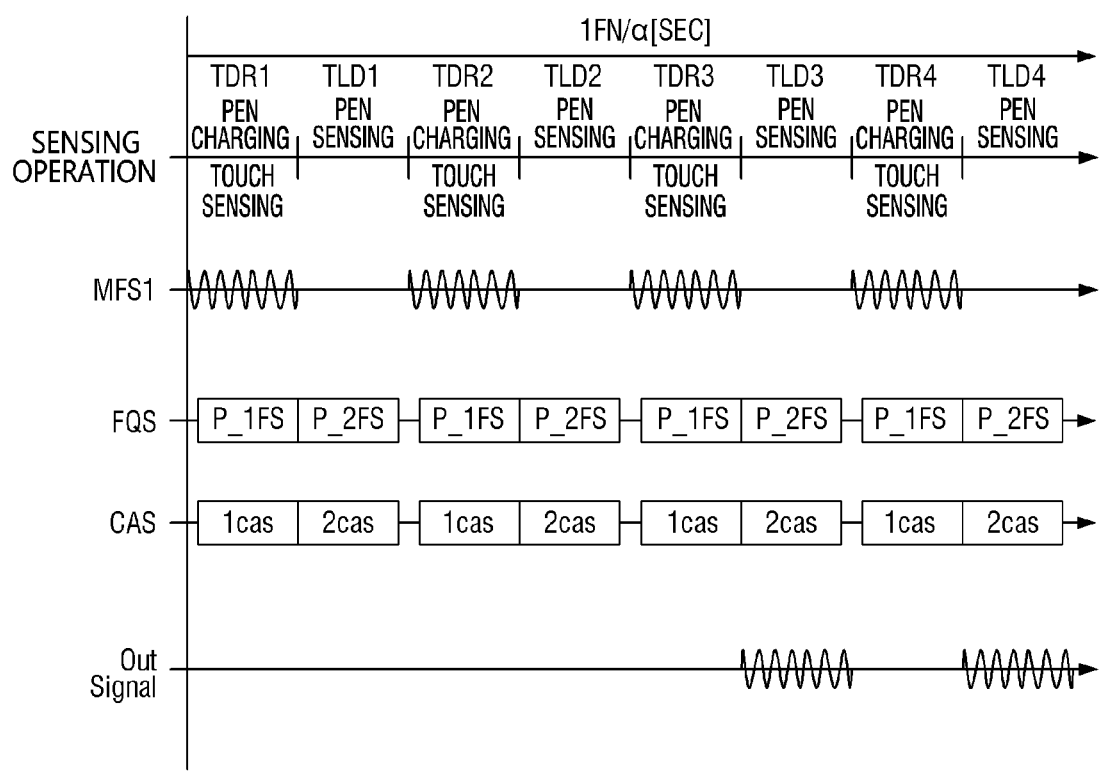
FIG. 14 is a timing diagram for explaining a method of sensing a user's touch and an electronic pen's touch according to an embodiment.

FIG. 14 is a timing diagram for explaining a method of sensing a user's touch and an electronic pen's touch according to an embodiment.

Referring to FIG. 14, since it is not necessary to precisely detect a touch position in a period for detecting the touch start of a user's body part or the electronic pen 20 according to embodiments, the touch start of the electronic pen 20 may be sensed using only the driving electrodes TE among the touch electrodes SE.

To this end, the driving signal supply circuit units TDR1 through TDRn may sequentially supply a second driving signal 2FS or touch driving signals MFS mixed with the second driving signal 2FS to the odd-numbered driving electrodes or the odd-numbered groups of driving electrodes TE1D through TE7D in each touch electrode driving period (each pen charging period of FIG. 14) in units of at least one frame period 1FN.

The signal analysis circuit units TLD1 through TLDn receive touch sensing signals output from the even-numbered groups of driving electrodes TE in each sensing signal detection period (each pen sensing period of FIG. 14). The signal analysis circuit units TLD1 through TLDn may band-pass filter the touch sensing signals in the second frequency band in response to a second frequency setting signal P_2FS, and mix the filtered touch sensing signals with a second carry signal 2cas to classify the touch sensing signals as touch sensing signals for sensing a touch of the electronic pen 20. Accordingly, the touch sensing circuit 400 may detect the presence of a touch and a touch start time of the electronic pen 20 by detecting a change in the amplitude of each of the touch sensing signals output through the signal analysis circuit units TLD1 through TLDn in each sensing signal detection period.

Figure 15:
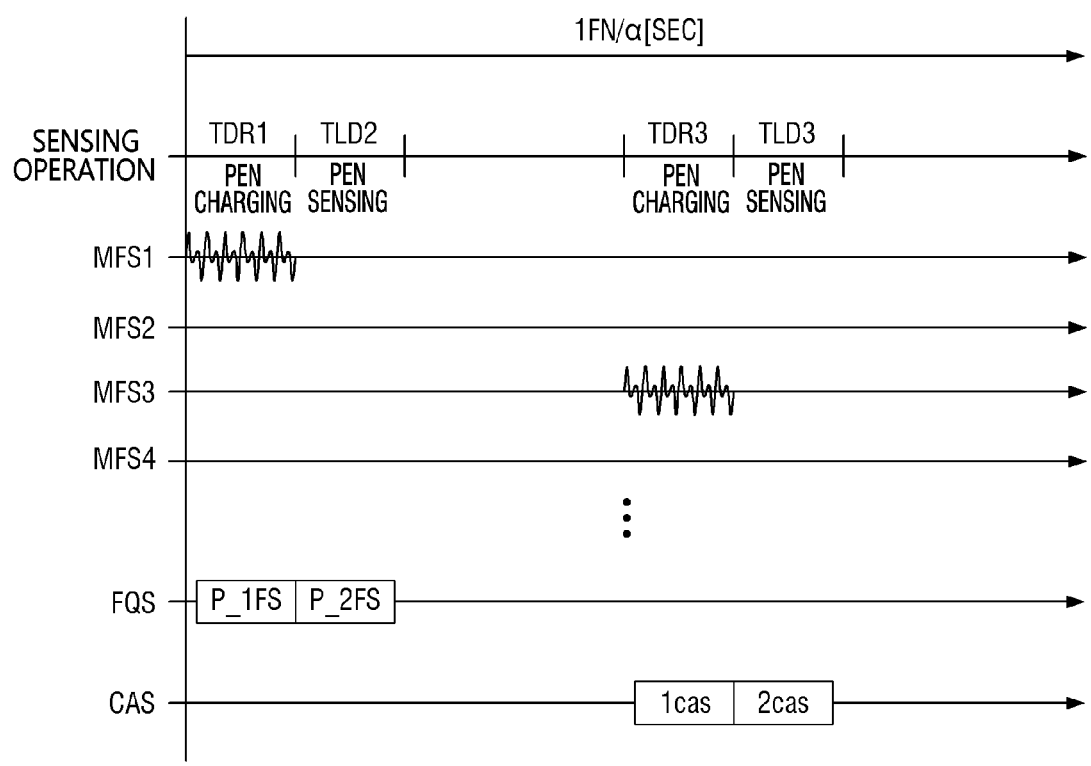
FIG. 15 is a timing diagram for explaining a method of sensing a user's touch and an electronic pen's touch according to an embodiment.

FIG. 15 is a timing diagram for explaining a method of sensing a user's touch and an electronic pen's touch according to an embodiment.

Referring to FIG. 15, the driving signal supply circuit units TDR1 through TDRn may sequentially supply touch driving signals MFS1, MFS3, . . . MFSn−1 to the odd-numbered driving electrodes TE or the odd-numbered groups of driving electrodes TE only during odd-numbered touch electrode driving periods among touch electrode driving periods (pen charging periods of FIG. 15) of at least one frame period 1FN.

Odd-numbered signal analysis circuit units TLD1 through TLDn−1 receive touch sensing signals output from the even-numbered driving electrodes TE in each odd-numbered sensing signal detection period (each pen sensing period of FIG. 15). The odd-numbered signal analysis circuit units TLD1 through TLDn−1 may band-pass filter the touch sensing signals in the second frequency band in response to a second frequency setting signal P_2FS, and mix the filtered touch sensing signals with a second carry signal 2cas. Accordingly, the touch sensing circuit 400 may detect a touch and a touch start time of the electronic pen 20 by detecting a change in the amplitude of each of the touch sensing signals output through the odd-numbered signal analysis circuit units TLD1 through TLDn−1 in each sensing signal detection period.

Figure 16:
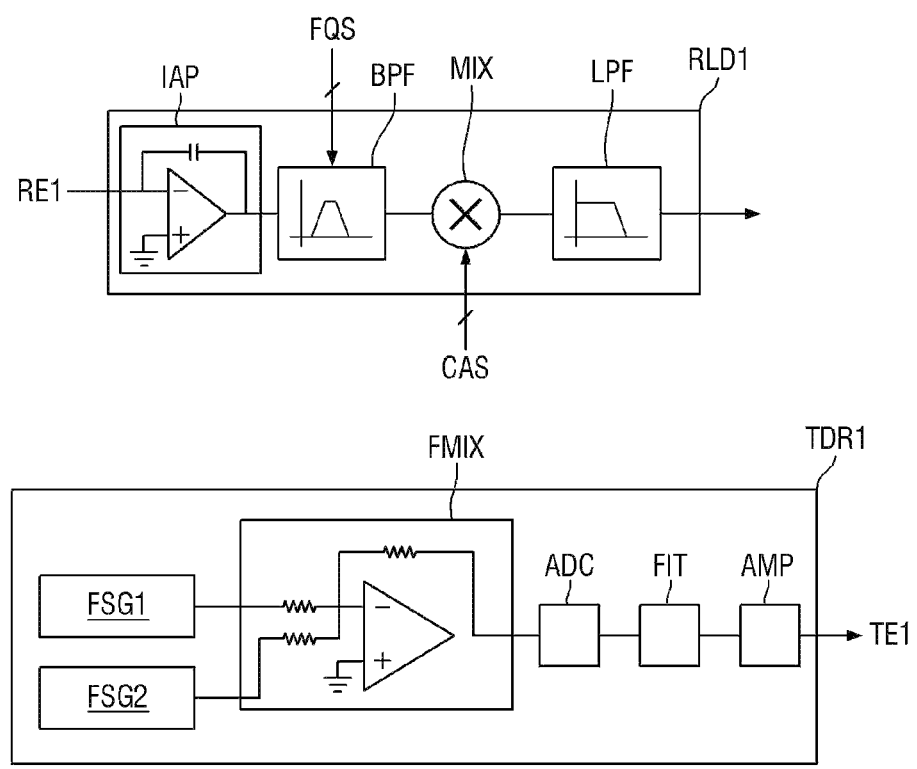
FIG. 16 is a block diagram illustrating the structure of a driving signal supply circuit unit and a sensing signal detection unit illustrated in FIG. 6 according to an embodiment.

FIG. 16 is a block diagram illustrating the structure of a driving signal supply circuit unit and a sensing signal detection unit illustrated in FIG. 6 according to an embodiment.

Referring to FIG. 16, each of the driving signal supply circuit units TDR1 through TDRn may include a first signal generation unit FSG1, a second signal generation unit FSG2, a mixed signal output unit FMIX, an AC conversion unit ADC, a frequency filtering circuit unit FIT, and a signal stabilization output unit AMP.

The first signal generating unit FSG1 generates the first driving signal of the first frequency band, and the second signal generating unit FSG2 generates the second driving signal of the second frequency band. The first driving signal and the second driving signal are supplied to the mixed signal output unit FMIX.

The mixing signal output unit FMIX generates a touch driving signal by mixing the first driving signal of the first frequency band and the second driving signal of the second frequency band.

The AC conversion unit ADC modulates the touch driving signal output from the mixed signal output unit FMIX into an analog signal in the first and second frequency bands and outputs the analog signal.

The frequency filtering circuit unit FIT may filter the frequency of the touch driving signal output from the AC conversion unit ADC within a preset maximum frequency range, and the signal stabilization output unit AMP may amplify the filtered touch driving signal within a preset voltage magnitude range and output the amplified touch driving signal to each driving electrode TE.

The sensing signal analysis circuit units RLD1 through RLDn may have the same structure as the signal analysis circuit units TLD1 through TLDn, respectively. Accordingly, the description of the structure of the signal analysis circuit units TLD1 through TLDn illustrated in FIG. 9 is applicable to the structure of the sensing signal analysis circuit units TLD1 through TLDn.

Figure 17:
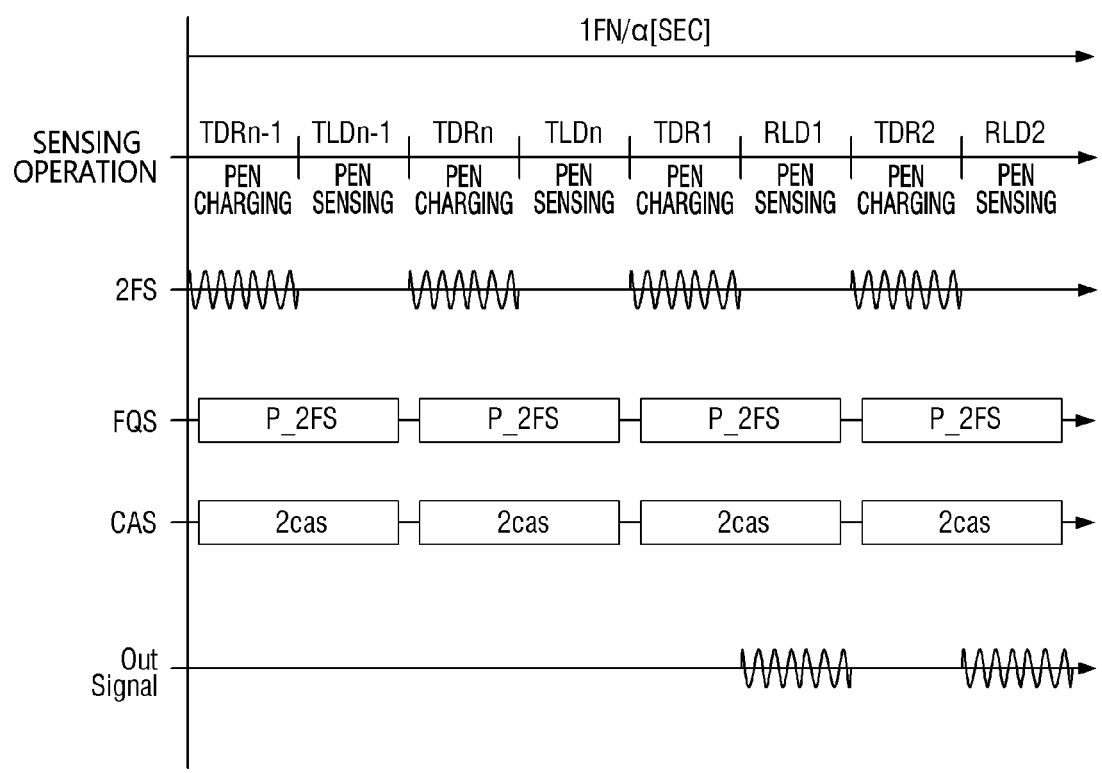
FIG. 17 is a timing diagram for explaining a method of sensing a user's touch and an electronic pen's touch according to an embodiment.

FIG. 17 is a timing diagram for explaining a method of sensing a user's touch and an electronic pen's touch according to an embodiment.

Referring to FIG. 17, in each sensing signal detection period (each pen sensing period of FIG. 17), a touch position of the electronic pen 20 and coordinates of the touch position may be detected using the sensing signal analysis circuit units RLD1 through RLDn and the signal analysis circuit units TLD1 through TLDn.

For example, the driving signal supply circuit units TDR1 through TDRn sequentially supply touch driving signals having a second driving signal 2FS to the odd-numbered driving electrodes TE1 or the odd-numbered groups of driving electrodes TE1 in each touch electrode driving period (each pen charging period of FIG. 17) in units of at least one frame period 1FN.

The sensing signal analysis circuit units RLD1 through RLDn receive touch sensing signals respectively output from the sensing electrodes RE in each sensing signal detection period. The sensing signal analysis circuit units RLD1 through RLDn may band-pass filter the touch sensing signals in the second frequency band in response to a second frequency setting signal P_2FS, and mix the filtered touch sensing signals with a second carry signal 2cas to classify the touch sensing signals as touch sensing signals for sensing a touch of the electronic pen 20.

In addition, the signal analysis circuit units TLD1 through TLDn receive touch sensing signals output from the even-numbered groups of driving electrodes TE in each sensing signal detection period. The signal analysis circuit units TLD1 through TLDn may band-pass filter the touch sensing signals in the second frequency band in response to the second frequency setting signal P_2FS, and mix the filtered touch sensing signals with the second carry signal 2cas to classify the touch sensing signals as touch sensing signals for detecting a touch of the electronic pen 20.

Accordingly, the touch sensing circuit 400 may detect a touch position of the electronic pen 20 and touch coordinates of the touch position by detecting a change in the amplitude of each of the touch sensing signals respectively output from the sensing signal analysis circuit units RLD1 through RLDn and the signal analysis circuit units TLD1 through TLDn in each sensing signal detection period.

Figure 18:
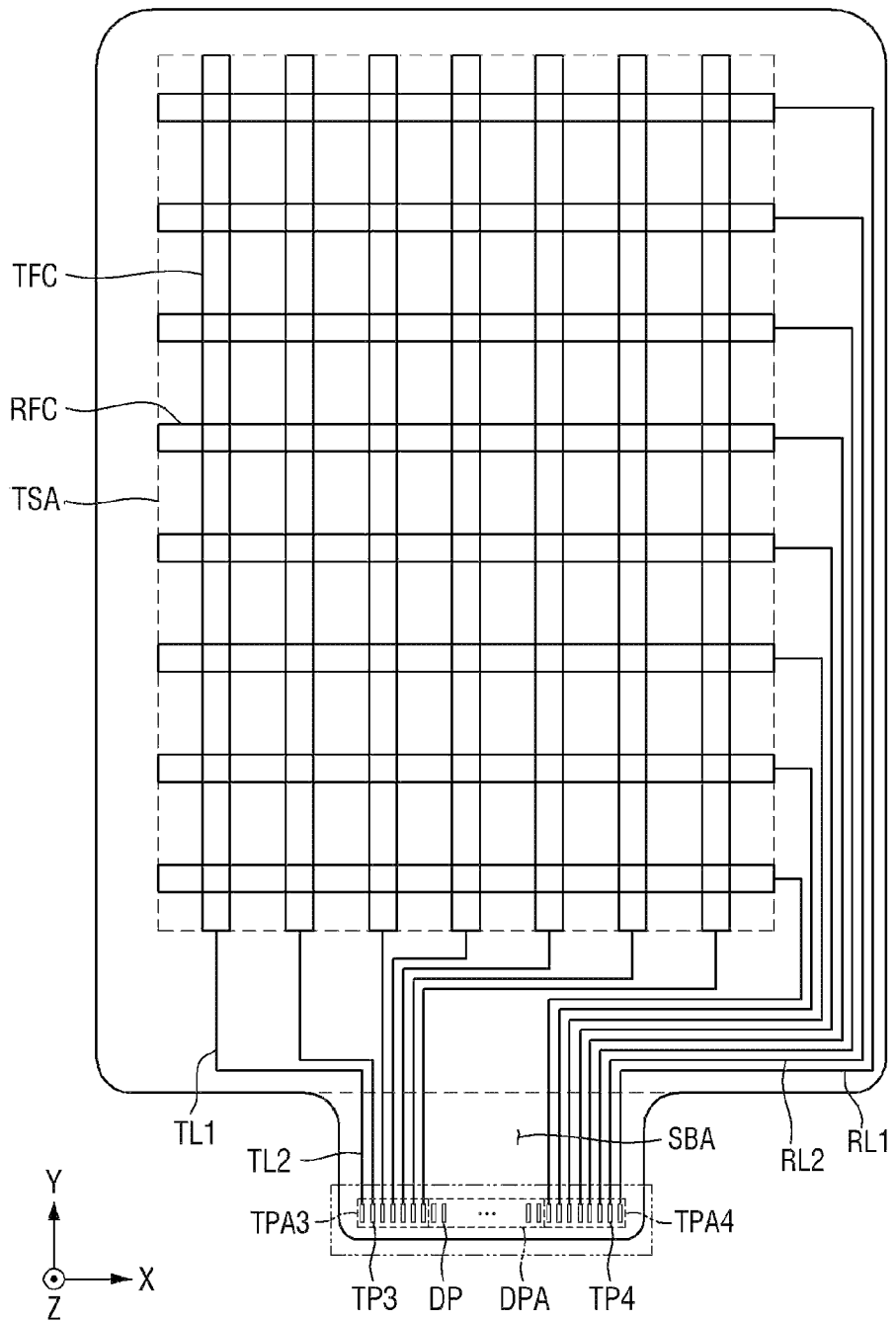
FIG. 18 is a schematic layout view of another example of the touch sensing unit illustrated in FIG. 3.

FIG. 18 is a schematic layout view of an example of the touch sensing unit TSU illustrated in FIG. 3 according to an embodiment.

Referring to FIG. 18, bar-type electrodes may be formed in the touch sensing area TSA, unlike the touch electrodes SE shaped like rhombic connection electrodes. That is, a plurality of bar-type driving electrodes TFC and a plurality of bar-type sensing electrodes RFC may be disposed in the touch sensing area TSA.

The bar-type driving electrodes TFC may extend parallel to each other in the second direction (Y-axis direction). Odd-numbered electrodes or electrodes included in odd-numbered groups among the bar-type driving electrodes TFC may receive touch driving signals supplied to their respective ends through first touch driving lines TL1. In addition, even-numbered electrodes or electrodes included in even-numbered groups among the bar-type driving electrodes TFC may output touch sensing signals to second touch driving lines TL2.

On the other hand, the bar-type sensing electrodes RFC may extend parallel to each other in the first direction (X-axis direction). The bar-type sensing electrodes RFC may output touch sensing signals to sensing lines RL through their respective ends.

The first touch driving lines TL1 connected to the odd-numbered bar-type driving electrodes TFC and the second touch driving lines TL2 connected to the even-numbered bar-type driving electrodes TFC may be connected one-to-one to third touch pads TP3. In addition, first sensing lines RL1 connected to odd-numbered bar-type sensing electrodes RFC and second sensing lines RL2 connected to even-numbered bar-type sensing electrodes RFC may be connected one-to-one to fourth touch pads TP4. In FIG. 18, TPA3 and TPA4 refer to third and fourth touch pad areas, respectively.

Figure 19:
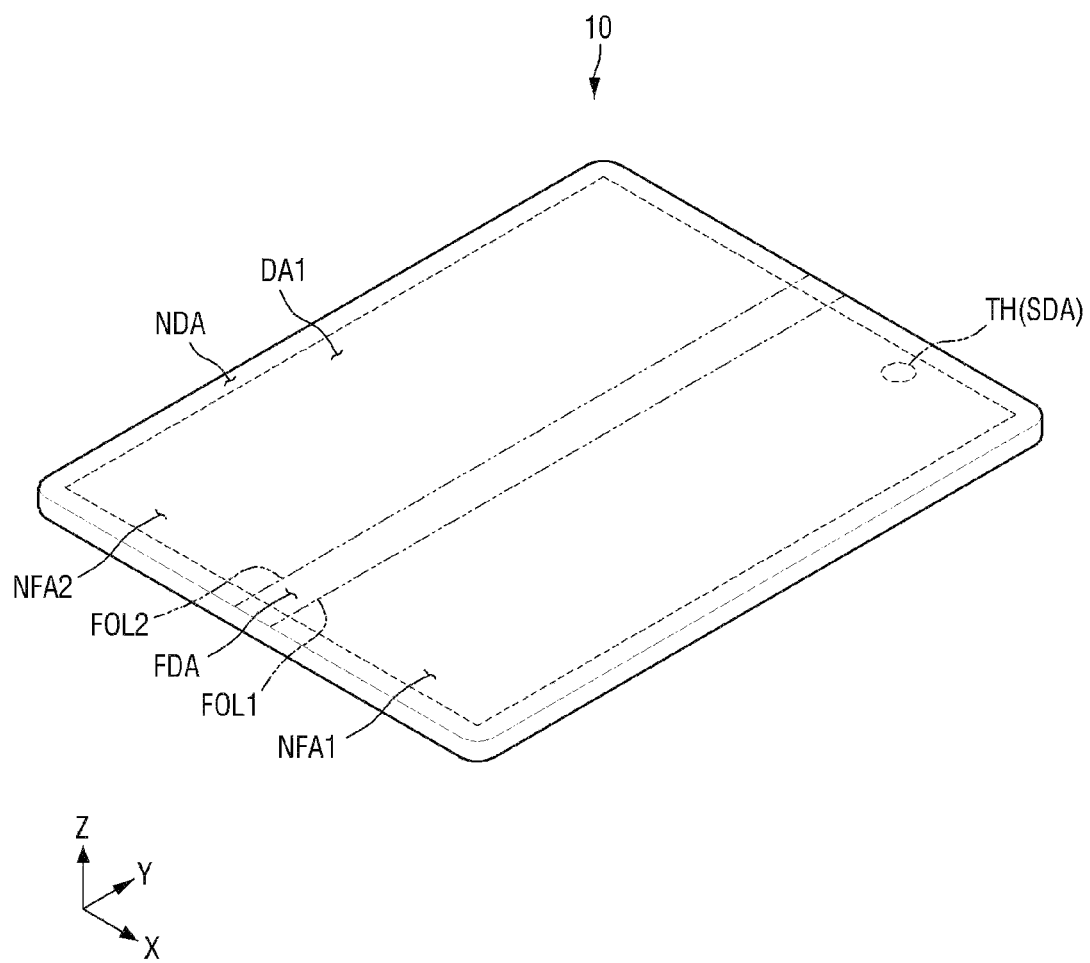
FIGS. 19 and 20 are perspective views of a display device according to an embodiment.
Figure 20:
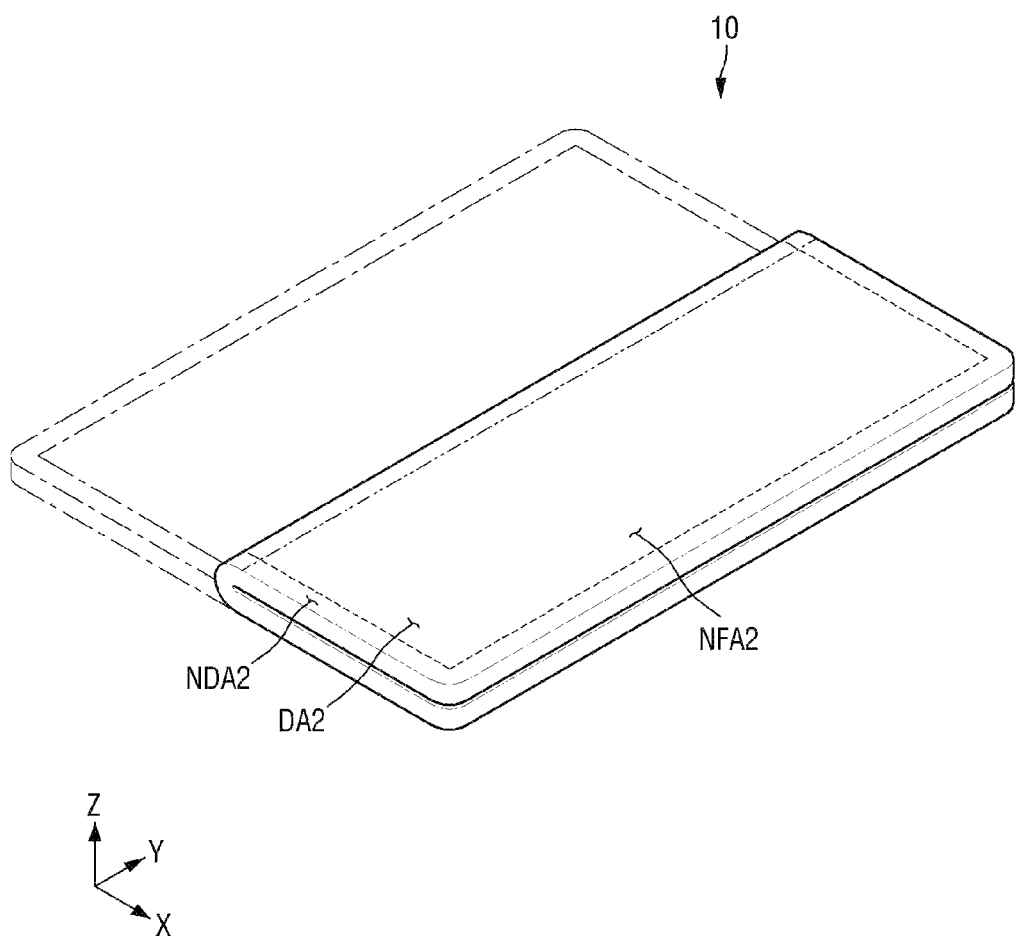

FIGS. 19 and 20 are perspective views of a display device 10 according to an embodiment.

In FIGS. 19 and 20, the display device 10 is illustrated as a foldable display device that is folded in the first direction (X-axis direction). The display device 10 may maintain both a folded state and an unfolded state. The display device 10 may be folded in an in-folding manner in which its front surface is disposed inside. When the display device 10 is bent or folded in the in-folding manner, portions of the front surface of the display device 10 may face each other. Alternatively, the display device 10 may be folded in an out-folding manner in which its front surface is disposed outside. When the display device 10 is bent or folded in the out-folding manner, portions of a rear surface of the display device 10 may face each other.

A first non-folding area NFA1 may be disposed on a side, e.g., a right side of a folding area FDA. A second non-folding area NFA2 may be disposed on the other side, e.g., a left side of the folding area FDA. A touch sensing unit TSU according to an embodiment of the present disclosure may be formed and disposed in each of the first non-folding area NFA1 and the second non-folding area NFA2.

A first folding line FOL1 and a second folding line FOL2 may extend in the second direction (Y-axis direction), and the display device 10 may be folded in the first direction (X-axis direction). Therefore, since a length of the display device 10 in the first direction (X-axis direction) can be reduced to about half, a user can more easily carry the display device 10.

According to embodiments, the first folding line FOL1 and the second folding line FOL2 do not necessarily extend in the second direction (Y-axis direction). For example, the first folding line FOL1 and the second folding line FOL2 may extend in the first direction (X-axis direction), and the display device 10 may be folded in the second direction (Y-axis direction). In this case, a length of the display device 10 in the second direction (Y-axis direction) may be reduced to about half. Alternatively, the first folding line FOL1 and the second folding line FOL2 may extend in a diagonal direction of the display device 10 between the first direction (X-axis direction) and the second direction (Y-axis direction). In this case, the display device 10 may be folded in a triangular shape.

When the first folding line FOL1 and the second folding line FOL2 extend in the second direction (Y-axis direction), a length of the folding area FDA may be smaller in the first direction (X-axis direction) than in the second direction (Y-axis direction). In addition, a length of the first non-folding area NFA1 in the first direction (X-axis direction) may be greater than the length of the folding area FDA in the first direction (X-axis direction). A length of the second non-folding area NFA2 in the first direction (X-axis direction) may be greater than the length of the folding area FDA in the first direction (X-axis direction).

A first display area DA1 may be disposed on the front surface of the display device 10. The first display area DA1 may overlap the folding area FDA, the first non-folding area NFA1, and the second non-folding area NFA2. Therefore, when the display device 10 is unfolded, an image may be displayed in a forward direction in the folding area FDA, the first non-folding area NFA1, and the second non-folding area NFA2 of the display device 10.

A second display area DA2 may be disposed on the rear surface of the display device 10. The second display area DA2 may overlap the second non-folding area NFA2. Therefore, when the display device 10 is folded, an image may be displayed in the forward direction in the second non-folding area NFA2 of the display device 10.

Although a through hole TH in which a camera SDA or the like is formed is disposed in the first non-folding area NFA1 in FIGS. 19 and 20, embodiments of the present disclosure are not limited thereto. For example, the through hole TH or the camera SDA may also be disposed in the second non-folding area NFA2 or the folding area FDA according to embodiments.

Figure 21:
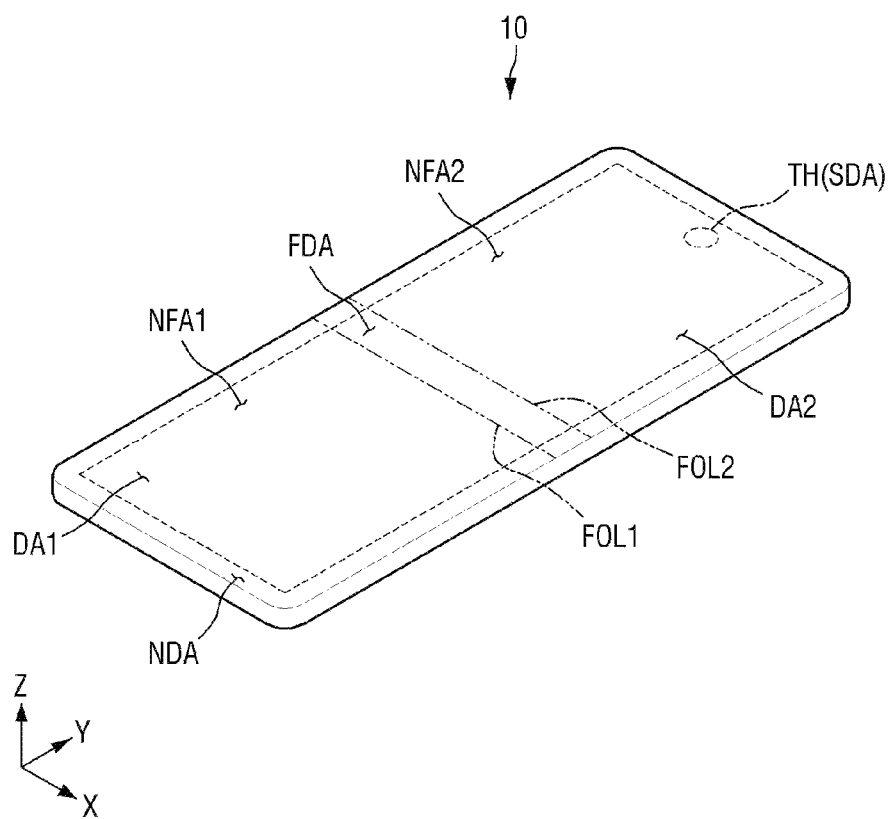
FIGS. 21 and 22 are perspective views of a display device according to an embodiment.
Figure 22:
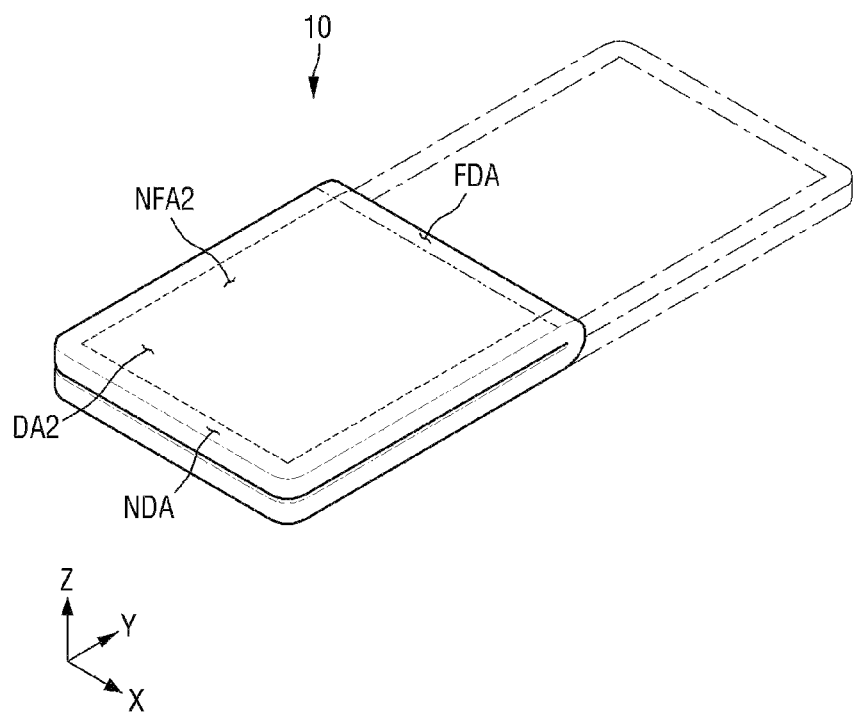

FIGS. 21 and 22 are perspective views of a display device 10 according to an embodiment.

In FIGS. 21 and 22, the display device 10 is illustrated as a foldable display device that is folded in the second direction (Y-axis direction). The display device 10 may maintain both a folded state and an unfolded state. The display device 10 may be folded in an in-folding manner in which its front surface is disposed inside. When the display device 10 is bent or folded in the in-folding manner, portions of the front surface of the display device 10 may face each other. Alternatively, the display device 10 may be folded in an out-folding manner in which its front surface is disposed outside. When the display device 10 is bent or folded in the out-folding manner, portions of a rear surface of the display device 10 may face each other.

The display device 10 may include a folding area FDA, a first non-folding area NFA1, and a second non-folding area NFA2. The folding area FDA may be an area where the display device 10 is folded, and the first non-folding area NFA1 and the second non-folding area NFA2 may be areas where the display device 10 is not folded. The first non-folding area NFA1 may be disposed on a side, e.g., a lower side of the folding area FDA. The second non-folding area NFA2 may be disposed on the other side, e.g., an upper side of the folding area FDA.

A touch sensing unit TSU according to an embodiment of the present application may be formed and disposed in each of the first non-folding area NFA1 and the second non-folding area NFA2.

On the other hand, the folding area FDA may be an area that is bent with a predetermined curvature along a first folding line FOL1 and a second folding line FOL2. Therefore, the first folding line FOL1 may be a boundary between the folding area FDA and the first non-folding area NFA1, and the second folding line FOL2 may be a boundary between the folding area FDA and the second non-folding area NFA2.

The first folding line FOL1 and the second folding line FOL2 may extend in the first direction (X-axis direction) as illustrated in FIGS. 21 and 22, and the display device 10 may be folded in the second direction (Y-axis direction). Therefore, since a length of the display device 10 in the second direction (Y-axis direction) can be reduced to about half, a user can more easily carry the display device 10.

According to embodiments, the first folding line FOL1 and the second folding line FOL2 may not necessarily extend in the first direction (X-axis direction). For example, the first folding line FOL1 and the second folding line FOL2 may extend in the second direction (Y-axis direction), and the display device 10 may be folded in the first direction (X-axis direction). In this case, a length of the display device 10 in the first direction (X-axis direction) may be reduced to about half. Alternatively, the first folding line FOL1 and the second folding line FOL2 may extend in a diagonal direction of the display device 10 between the first direction (X-axis direction) and the second direction (Y-axis direction). In this case, the display device 10 may be folded in a triangular shape.

When the first folding line FOL1 and the second folding line FOL2 extend in the first direction (X-axis direction) as illustrated in FIGS. 21 and 22, a length of the folding area FDA may be smaller in the second direction (Y-axis direction) than in the first direction (X-axis direction). In addition, a length of the first non-folding area NFA1 in the second direction (Y-axis direction) may be greater than the length of the folding area FDA in the second direction (Y-axis direction). A length of the second non-folding area NFA2 in the second direction (Y-axis direction) may be greater than the length of the folding area FDA in the second direction (Y-axis direction).

A first display area DA1 may be disposed on the front surface of the display device 10. The first display area DA1 may overlap the folding area FDA, the first non-folding area NFA1, and the second non-folding area NFA2. Therefore, when the display device 10 is unfolded, an image may be displayed in the forward direction in the folding area FDA, the first non-folding area NFA1, and the second non-folding area NFA2 of the display device 10.

A second display area DA2 may be disposed on the rear surface of the display device 10. The second display area DA2 may overlap the second non-folding area NFA2. Therefore, when the display device 10 is folded, an image may be displayed in the forward direction in the second non-folding area NFA2 of the display device 10.

Although a through hole TH in which a camera SDA or the like is placed is disposed in the second non-folding area NFA2 in FIGS. 21 and 22, embodiments of the present disclosure are not limited thereto. For example, according to embodiments, the through hole TH may also be disposed in the first non-folding area NFA1 or the folding area FDA.

A display device and a touch sensing system including the same according to embodiments can sense a touch of an electronic pen using a touch sensing unit for sensing a touch of a user's body part without including a separate sensor layer or digitizer layer. Therefore, the structure of the display device and the touch sensing system including the same may be simplified and the thickness thereof may be reduced, which may reduce manufacturing costs.

In addition, the display device and the touch sensing system including the same according to embodiments may allow the electronic pen to be charged during a period of sensing the user's body part and sense a touch position of the electronic pen during a discharging period of the electronic pen, which may increase the touch sensing speed of sensing the body part or the electronic pen and further increase the touch sensing accuracy.

As is traditional in the field of the present disclosure, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

However, the effects of the present disclosure are not limited to those set forth herein.

While the present disclosure has been particularly shown and described with reference to embodiments thereof, it will be understood by those of ordinary skill in the art that various changes in form and detail may be made therein without departing from the spirit and scope of the present invention as defined by the following claims.

What is claimed is:

1. A display device, comprising:
    a display panel comprising a plurality of pixels arranged in an image display area;
    a touch sensing unit disposed on a front surface of the display panel that senses a touch of a user's body part and a touch of an electronic pen;
    a display driving circuit that drives the pixels of the image display area; and
    a touch sensing circuit that generates touch coordinate data by detecting touch positions of the user's body part and the electronic pen,
    wherein the touch sensing circuit senses the touch of the user's body part and allows the electronic pen to be charged during a touch electrode driving period by supplying touch driving signals generated by mixing driving signals of different frequency bands to touch electrodes during the touch electrode driving period,
    wherein the touch electrodes comprise a plurality of driving electrodes and a plurality of sensing electrodes,
    wherein the different frequency bands include a first frequency band used to sense the touch of the user's body part and a second frequency band used to sense the touch of the electronic pen,
    wherein the touch sensing circuit comprises a plurality of signal analysis circuit units and a plurality of driving signal supply circuit units,
    wherein the plurality of signal analysis circuit units detect touch sensing signals of the second frequency band during a sensing signal detection period after the touch electrode driving period and detect a touch of the electronic pen according to a change in an amplitude of each of the detected touch sensing signals,
    wherein the plurality of driving signal supply circuit units supply touch driving signals in which first and second driving signals of the first and second frequency bands different from each other among the touch driving signals are mixed to odd-numbered driving electrodes or odd-numbered groups of driving electrodes among the driving electrodes during the touch electrode driving period of the touch sensing unit.

2. The display device of claim 1, wherein the touch electrodes comprise:
    the plurality of driving electrodes extend parallel to each other in a first direction in a touch sensing area of the display panel,
    the plurality of sensing electrodes extend parallel to each other in a second direction intersecting the first direction in the touch sensing area, and
    the driving electrodes and the sensing electrodes are formed in a rod type or a bar type in which polygonal electrodes are connected in the first or second direction.

3. The display device of claim 1,
    wherein the touch sensing signals of the second frequency band detected by the plurality of signal analysis circuit units are output from even-numbered driving electrodes or even-numbered groups of driving electrodes among the driving electrodes.

4. The display device of claim 1, wherein the touch sensing circuit further comprises:
    a plurality of sensing signal analysis circuit units that detect touch sensing signals of the first frequency band output from the sensing electrodes during the touch electrode driving period and sense the touch of the user's body part according to a change in a current amount or voltage magnitude of each of the detected touch sensing signals.

5. The display device of claim 4, wherein the sensing signal analysis circuit units detect touch sensing signals of the second frequency band output from the sensing electrodes during the sensing signal detection period among the touch sensing signals and detect the touch of the electronic pen according to a change in the amplitude of each of the detected touch sensing signals.

6. The display device of claim 5, wherein each of the sensing signal analysis circuit units comprises:
a differential amplifier circuit that detects a voltage difference between touch sensing signals input through adjacent odd-numbered and even-numbered sensing electrodes and outputs a differential signal according to the detected voltage difference;
a band-pass filtering circuit that filters the differential signal of the first or second frequency band in response to a first or second frequency setting signal and outputs only the filtered differential signals of the first or second frequency band; and
a carry signal input circuit that mixes the differential signal of the first or second frequency band with a first or second carry signal and outputs a resultant signal.

7. The display device of claim 1, wherein each of the driving signal supply circuit units comprises:
a first signal generation circuit unit that generates a first driving signal of the first frequency band;
a first analog conversion (AC) circuit unit that modulates the first driving signal into an analog signal of the first frequency band and outputs the analog signal of the first frequency band;
a second signal generation circuit unit that generates a second driving signal of the second frequency band;
a second AC circuit unit that modulates the second driving signal into an analog signal of the second frequency band and outputs the analog signal of the second frequency band; and
a mixed signal output circuit unit that mixes the first and second driving signals of the first and second frequency bands and generates and outputs a touch driving signal in which the first and second frequency bands are mixed among the touch driving signals.

8. The display device of claim 1, wherein each of the signal analysis circuit units comprises:
a differential amplifier circuit that outputs a differential signal according to a voltage difference between touch sensing signals input through the odd-numbered and even-numbered driving electrodes or adjacent odd-numbered and even-numbered groups of driving electrodes among the touch sensing signals;
a band-pass filtering circuit that filters the differential signal of the first or second frequency band in response to a first or second frequency setting signal and outputs only the filtered differential signal of the first or second frequency band; and
a carry signal input circuit that mixes the differential signal of the first or second frequency band with a first or second carry signal and outputs a resultant signal.

9. The display device of claim 4, wherein the driving signal supply circuit units simultaneously supply the touch driving signals in which the first and second driving signals are mixed to the odd-numbered driving electrodes or the odd-numbered groups of driving electrodes during the touch electrode driving period or sequentially supply the touch driving signals to the odd-numbered groups of driving electrodes, and the sensing signal analysis circuit units band-pass filter the touch sensing signals output from the sensing electrodes in the first frequency band according to the first frequency setting signal during the touch electrode driving period, classify the filtered touch sensing signals as touch sensing signals for sensing a touch of a body part by mixing the filtered touch sensing signals with the first carry signal, and measure a change in a charge amount of mutual capacitance applied to touch nodes according to a change in a voltage magnitude of each of the classified touch sensing signals.

10. The display device of claim 9, wherein the signal analysis circuit units detect the touch sensing signals of the second frequency band sequentially or simultaneously output from the even-numbered driving electrodes or the even-numbered groups of driving electrodes during the sensing signal detection period and detect a touch and a touch position of the electronic pen according to a change in the amplitude of each of the detected touch sensing signals.

11. The display device of claim 4, wherein the driving signal supply circuit units sequentially supply the touch driving signals in which the first and second driving signals are mixed to the odd-numbered driving electrodes or the odd-numbered groups of driving electrodes during the touch electrode driving period in units of at least one frame period, and the signal analysis circuit units receive touch sensing signals output from the even-numbered groups of driving electrodes during the sensing signal detection period, band-pass filter the touch sensing signals in the second frequency band according to the second frequency setting signal, and mix the filtered touch sensing signals with the second carry signal to classify the filtered touch sensing signals as touch sensing signals for sensing a touch of the electronic pen.

12. The display device of claim 4, wherein the driving signal supply circuit units sequentially supply the touch driving signals in which the first and second driving signals are mixed to the odd-numbered driving electrodes or the odd-numbered groups of driving electrodes only during odd-numbered touch electrode driving periods among touch electrode driving periods of at least one frame period, and odd-numbered signal analysis circuit units among the signal analysis circuit units band-pass filter touch sensing signals output from the even-numbered driving electrodes during odd-numbered sensing signal detection periods in the second frequency band and detect a presence of a touch of the electronic pen and a touch start time by detecting a change in the amplitude of each of the touch sensing signals.

13. The display device of claim 4, wherein the driving signal supply circuit units sequentially supply the touch driving signals in which the first and second driving signals are mixed to the odd-numbered driving electrodes or the odd-numbered groups of driving electrodes during the touch electrode driving period in units of at least one frame period, and the sensing signal analysis circuit units band-pass filter touch sensing signals output from the sensing electrodes during the sensing signal detection period in the second frequency band, detect a change in the amplitude of each of the touch sensing signals, and detect a touch position of the electronic pen according to the change in the amplitude of each of the touch sensing signals.

14. The display device of claim 13, wherein the signal analysis circuit units band-pass filter touch sensing signals output from the even-numbered groups of driving electrodes during the sensing signal detection period in the second frequency band, detect a change in the amplitude of each of the touch sensing signals, and detect the touch position of the electronic pen according to the change in the amplitude of each of the touch sensing signals.

15. A touch sensing system, comprising:
a display device comprising a display panel comprising a plurality of pixels arranged in an image display area, and a display driving circuit that drives the pixels;
a touch sensing unit disposed on a front surface of the display panel that senses a touch of a user's body part and a touch of an electronic pen;
a touch sensing circuit that generates touch coordinate data by detecting touch positions of the user's body part and the electronic pen,
wherein the touch sensing circuit senses the touch of the user's body part through the touch sensing unit and allows the electronic pen to be charged by supplying touch driving signals generated by mixing driving signals of different frequency bands to touch electrodes of the touch sensing unit,
wherein the different frequency bands include a first frequency band used to sense the touch of the user's body part and a second frequency band used to sense the touch of the electronic pen; and
wherein the touch sensing circuit comprises a plurality of signal analysis circuit units and a plurality of driving signal supply circuit units,
wherein the plurality of signal analysis circuit units detect touch sensing signals of the second frequency band during a sensing signal detection period after the touch electrode driving period and detect a touch of the electronic pen according to a change in an amplitude of each of the detected touch sensing signals,
wherein the plurality of driving signal supply circuit units supply touch driving signals in which first and second driving signals of the first and second frequency bands are mixed to odd-numbered driving electrodes or odd-numbered groups of driving electrodes among driving electrodes disposed in the touch sensing unit during a touch electrode driving period of the touch sensing unit.

16. The system of claim 15,
wherein the touch sensing signals of the second frequency band detected by the plurality of signal analysis circuit units are output from even-numbered driving electrodes or even-numbered groups of driving electrodes among the driving electrodes.

17. The system of claim 16, wherein the touch sensing circuit further comprises:
a plurality of sensing signal analysis circuit units that detect touch sensing signals of the first frequency band output from sensing electrodes disposed in the touch sensing unit during the touch electrode driving period and sense the touch of the user's body part according to a change in a current amount or voltage magnitude of each of the detected touch sensing signals.

18. The system of claim 17, wherein the sensing signal analysis circuit units detect touch sensing signals of the second frequency band output from the sensing electrodes during the sensing signal detection period and detect the touch of the electronic pen according to a change in the amplitude of each of the detected touch sensing signals.

19. The system of claim 17, wherein each of the driving signal supply circuit units comprises:
a first signal generation circuit unit that generates a first driving signal of the first frequency band;
a first analog conversion (AC) circuit unit that modulates the first driving signal into an analog signal of the first frequency band and outputs the analog signal of the first frequency band;
a second signal generation circuit unit that generates a second driving signal of the second frequency band;
a second AC circuit unit that modulates the second driving signal into an analog signal of the second frequency band and outputs the analog signal of the second frequency band; and
a mixed signal output circuit unit that mixes the first and second driving signals of the first and second frequency bands and generates and outputs a touch driving signal in which the first and second frequency bands are mixed among the touch driving signals.

20. The system of claim 17, wherein each of the signal analysis circuit units comprises:
a differential amplifier circuit that outputs a differential signal according to a voltage difference between touch sensing signals input through the odd-numbered and even-numbered driving electrodes or adjacent odd-numbered and even-numbered groups of driving electrodes among the touch sensing signals;
a band-pass filtering circuit that filters the differential signal of the first or second frequency band in response to a first or second frequency setting signal and outputs only the filtered differential signal of the first or second frequency band; and
a carry signal input circuit that mixes the differential signal of the first or second frequency band with a first or second carry signals and outputs a resultant signal.

* * * * *